(12) United States Patent
Brace

(10) Patent No.: US 12,114,723 B2
(45) Date of Patent: Oct. 15, 2024

(54) VIEWING DEVICE MOUNT EMPLOYING LATERALLY ROTATING MECHANISM

(71) Applicant: Neal John Brace, Ada, MI (US)

(72) Inventor: Neal John Brace, Ada, MI (US)

(*) Notice: Subject to any disclaimer, the term of this patent is extended or adjusted under 35 U.S.C. 154(b) by 186 days.

(21) Appl. No.: 17/536,930

(22) Filed: Nov. 29, 2021

(65) Prior Publication Data

US 2022/0167703 A1    Jun. 2, 2022

Related U.S. Application Data

(60) Provisional application No. 63/118,915, filed on Nov. 28, 2020.

(51) Int. Cl.
*A42B 3/04* (2006.01)
*G02B 7/00* (2021.01)

(52) U.S. Cl.
CPC .............. *A42B 3/042* (2013.01); *G02B 7/002* (2013.01)

(58) Field of Classification Search
CPC ................................. G02B 7/002; A24B 3/042
USPC .......................................................... 359/409
See application file for complete search history.

(56) References Cited

U.S. PATENT DOCUMENTS

| 2010/0180364 A1* | 7/2010 | Willey .................... A42B 3/042 |
| | | 2/422 |
| 2012/0200917 A1* | 8/2012 | Rivkin ................. G02B 23/125 |
| | | 359/480 |
| 2014/0327962 A1* | 11/2014 | Teetzel ................. G02B 23/125 |
| | | 359/409 |
| 2015/0002930 A1* | 1/2015 | Teetzel ............... G02B 27/0149 |
| | | 359/409 |
| 2016/0120296 A1* | 5/2016 | DiCarlo ................... F16C 11/10 |
| | | 248/220.22 |
| 2016/0369942 A1 | 12/2016 | DiCarlo et al. |
| 2018/0314052 A1 | 11/2018 | Prendergast et al. |

OTHER PUBLICATIONS

PCT Application Serial No. PCT/US21/61019, International Search Report and Written Opinion dated Jun. 29, 2022.

\* cited by examiner

*Primary Examiner* — Sharrief I Broome
(74) *Attorney, Agent, or Firm* — Larry E. Henneman, Jr.; Henneman & Associates, PLC

(57) ABSTRACT

A novel viewing device mount includes a base and a first articulating arm. The first articulating arm includes a proximal end movably coupled to the base and a distal end configured to couple an optical device to the first articulating arm. The articulating arm further includes a first joint and a second joint. The first joint facilitates angular displacement of the optical axis of the optical device and the second joint facilitates translational displacement of the optical axis of the optical device. In a more particular embodiment, the viewing device further includes a second articulating arm having a proximal end coupled to the base and a distal end configured to couple a second optical device to the second articulating arm. In another particular embodiment, the base is configured to be removably attached to a head worn device such as, for example, a combat helmet.

19 Claims, 20 Drawing Sheets

VIEWING DEVICE MOUNT EMPLOYING LATERALLY ROTATING MECHANISM

RELATED APPLICATIONS

This application claims the benefit of priority of U.S. Provisional Patent Application No. 63/118,915, filed on Nov. 28, 2020 by the same inventor, which is incorporated herein by reference in its entirety.

BACKGROUND OF THE INVENTION

Field of the Invention

This invention relates generally to enhanced viewing devices, and more particularly to an adjustable mount for enhanced viewing devices.

Description of the Background Art

Enhanced viewing devices (e.g., analog intensifying night vision monocular, thermographic camera, digital ultra-low light camera, magnified monocular, etc.) are conventionally mounted and aligned in pairs and in a straight-forward fashion that only permits a user to see a single circular image, usually between twenty and forty degrees field of view (FOV), as shown in prior art FIG. 1. When mounted in pairs, such alignment ensures that the resulting two pupil images are sharp and perfectly overlapped. However, it does not improve the field of view compared to a single viewing device. In practice, this limited field of view prevents the user from gaining a comfortable amount of situational awareness and is typically referred to as, "looking through a tube". In addition, such alignment requires the user to move the enhanced viewing devices out of the way if they wish to use ambient light to view a scene with the naked eye rather than looking directly through the enhanced viewing device. It is sometimes beneficial for users to look at scenes without the aid of enhanced viewing devices due to the ability of the human brain to accurately gauge the darkness of a certain area or brightness of a powered light or reflective object, for example, in order to more properly estimate distance, texture, shape, color, or similar visual properties.

In effort to increase field of view, panoramic night vision goggles have been developed that may achieve a field of view of approximately 120 degrees. Such devices combine four or more viewing devices arranged in a specific orientation, wherein the two inner devices are aligned in a relatively straight-forward fashion and the two outer devices are rotated laterally outward. In such a configuration, the pupil images of the two outboard devices are overlapped with the two inboard devices. Although panoramic night vision goggles increase the usable field of view, they also have inherent disadvantages. For example, they require four viewing devices, which significantly increases their complexity, weight, and cost compared to systems that employ only two enhanced viewing devices. As another example, there is typically no way for a user to individually move one or more of the viewing devices out of the way if they wish to use ambient light to view a scene with the naked eye instead of looking directly through the viewing device. Instead, the user is forced to move the entire goggle system out of the way by either flipping up all the goggles simultaneously or peering above the goggles.

SUMMARY

The present invention overcomes the problems associated with the prior art by providing an enhanced viewing device mount that facilitates the independent adjustment of at least two separate viewing device mounts. Aspects of the invention allow the user to modify the amount of horizontal field by varying the lateral rotation of either viewing device. Aspects of the invention additionally allow a user to temporarily observe a scene with an unaided eye, by looking through an enlarged gap between viewing devices.

An example viewing device mount includes a base and a first articulating arm. The base has a sagittal plane passing therethrough, so the base has a first portion disposed on a first side of the sagittal plane and a second portion disposed on a second side of the sagittal plane opposite the first side of the sagittal plane. The first articulating arm has a proximal end and a distal end, and first articulating arm is disposed on the first side of the sagittal plane. The first articulating arm can include a first member and a second member. The first member can be movably coupled to the base at a first joint, and the second member can be movably coupled to the first member at a second joint. The distal end of the first articulating arm can be configured to couple a first optical device to the first articulating arm. The first optical device has an optical axis that, in a first position, is aligned with a reference axis. The reference axis can be parallel to the sagittal plane and lie in a second plane perpendicular to the sagittal plane. In a particular example, one of the first joint and the second joint can facilitate angular displacement of the optical axis of the first optical device with respect to the reference axis, and the other of the first joint and the second joint can facilitate translational displacement of the optical axis of the first optical device with respect to the reference axis.

In a particular example viewing device mount, the first member is rotatable about a first axis passing through the first joint, and the second member is rotatable about a second axis passing through the second joint. The first axis can be substantially perpendicular to the second axis. The first joint facilitates the angular displacement of the optical axis of the first optical device with respect to the reference axis, and the second joint facilitates the translational displacement of the optical axis of the first optical device with respect to the reference axis.

In example viewing device mounts, the first member can frictionally engage the base at the first joint, such that a position of the first member with respect to the base remains fixed absent an application of an external force exceeding inertial forces exerted thereon by the first optical device. In addition, the second member can frictionally engage the first member at the second joint, such that a position of the second member with respect to the first member remains fixed absent an application of an external force exceeding a force exerted thereon by a weight of the first optical device. In other words, the first and second joints are manually adjustable, but the frictional forces are sufficient to maintain position despite spurious external forces.

The base can include an attachment feature that facilitates the removable attachment of the base to a complementary receiver of a head-worn device (e.g. a helmet, a support band, and so on).

Optionally, the distal end of the first articulating arm can include a fastener configured to removably attach the first optical device to the distal end of the first articulating arm.

Example viewing device mounts can additionally include a second articulating arm. The second articulating arm has a proximal end and a distal end, and the second articulating arm can be disposed on the second side of the sagittal plane. The second articulating arm can include a third member and a fourth member. The third member can be movably coupled to the base at a third joint, and the fourth member can be movably coupled to the third member at a fourth joint. The distal end of the second articulating arm can be configured to couple a second optical device to the second articulating arm. The second optical device can have an optical axis that, in a first position, is aligned with a second reference axis. The second reference axis can be parallel to the sagittal plane and lie in a third plane perpendicular to the sagittal plane. One of the third joint and the fourth joint can facilitate angular displacement of the optical axis of the second optical device with respect to the second reference axis, and the other of the third joint and the fourth joint can facilitate translational displacement of the optical axis of the second optical device with respect to the second reference axis.

In an example viewing device mount, the first member can be rotatable about a first axis passing through the first joint, and the second member can be rotatable about a second axis passing through the second joint. The third member can be rotatable about a third axis passing through the third joint, and the fourth member can be rotatable about a fourth axis passing through the fourth joint. The first axis can be substantially perpendicular to the second axis, and the third axis can be substantially perpendicular to the fourth axis. The first joint can facilitate angular displacement of the optical axis of the first optical device with respect to the reference axis, and the second joint can facilitate translational displacement of the optical axis of the first optical device with respect to the reference axis. The third joint can facilitate angular displacement of the optical axis of the second optical device with respect to the reference axis, and the fourth joint can facilitate translational displacement of the optical axis of the second optical device with respect to the reference axis.

The first articulating arm and the second articulating arm are configured to articulate independently from one another. The first member can frictionally engage the base at the first joint, such that a position of the first member with respect to the base remains fixed absent application of an external force that exceeds inertial forces exerted thereon by the first optical device. The second member can frictionally engage the first member at the second joint, such that a position of the second member with respect to the first member remains fixed absent application of an external force that exceeds a force exerted thereon by the weight of the first optical device. The third member can frictionally engage the base at the third joint, such that a position of the third member with respect to the base remains fixed absent application of an external force that exceeds inertial forces exerted thereon by the second optical device. The fourth member can frictionally engage the third member at the fourth joint, such that a position of the fourth member with respect to the third member remains fixed absent application of an external force that exceeds a force exerted thereon by the weight of the second optical device. Optionally, any or all of the frictional forces described herein can be adjustable.

The distal end of the first articulating arm can include a first fastener configured to removably attach the first optical device to the distal end of the first articulating arm. Similarly, the distal end of the second articulating arm can include a second fastener configured to removably attach the second optical device to the distal end of the second articulating arm.

In an example viewing device mount, the first member can be a first monolithic structure, the second member can be a second monolithic structure, the third member can be a third monolithic structure, the fourth member can be a fourth monolithic structure, and the base can be a fifth monolithic structure. In another example embodiment, the first member is a first monolithic structure, the second member is a second monolithic structure, and the base is a third monolithic structure.

Another example viewing device mount includes a base and a first articulating arm. The base has a sagittal plane passing therethrough. The base has a first portion disposed on a first side of the sagittal plane and a second portion disposed on a second side of the sagittal plane opposite the first side of the sagittal plane. The first articulating arm can have a first member and a second member. The first member can be movably coupled to the base at a first joint, and the second member can be movably coupled to the first member at a second joint. The second member can also be configured to couple a first optical device to the first articulating arm. One of the first joint and the second joint can facilitate adjustment of an adduction angle of the first optical device, and the other of the first joint and the second joint can facilitate transitioning the first optical device between an operating position (e.g., in the line of sight of a user) and a stowed position (e.g., out of the field of vision of the wearer).

The example viewing device mount can additionally include a second articulating arm. The second articulating arm can have a third member and a fourth member. The third member can be movably coupled to the base at a third joint, and the fourth member can be movably coupled to the third member at a third joint. The fourth member can also be configured to couple a second optical device to the second articulating arm. One of the third joint and the fourth joint can facilitate adjustment of an adduction angle of the second optical device, and the other of the third joint and the fourth joint can facilitate transitioning of the second optical device between an operating position and a stowed position.

The first articulating arm and the second articulating arm can be configured to articulate independently from one another. The first member can be rotatable about a first axis passing through the first joint, and the second member can be rotatable about a second axis passing through the second joint. The third member can be rotatable about a third axis passing through the third joint, and the fourth member can be rotatable about a fourth axis passing through the fourth joint. The first axis can be substantially perpendicular to the second axis, and the third axis can be substantially perpendicular to the fourth axis.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a mounting structure for enhanced viewing devices. In the following description, numerous specific details are set forth (e.g., enhanced viewing device types, materials, etc.) in order to provide a thorough understanding of the invention. Those skilled in the art will recognize, however, that the invention may be practiced apart from these specific details. In other instances, details of well-known manufacturing practices (e.g., molding, cutting, tapping, etc.) and components have been omitted, so as not to unnecessarily obscure the present invention.

Figure 2:
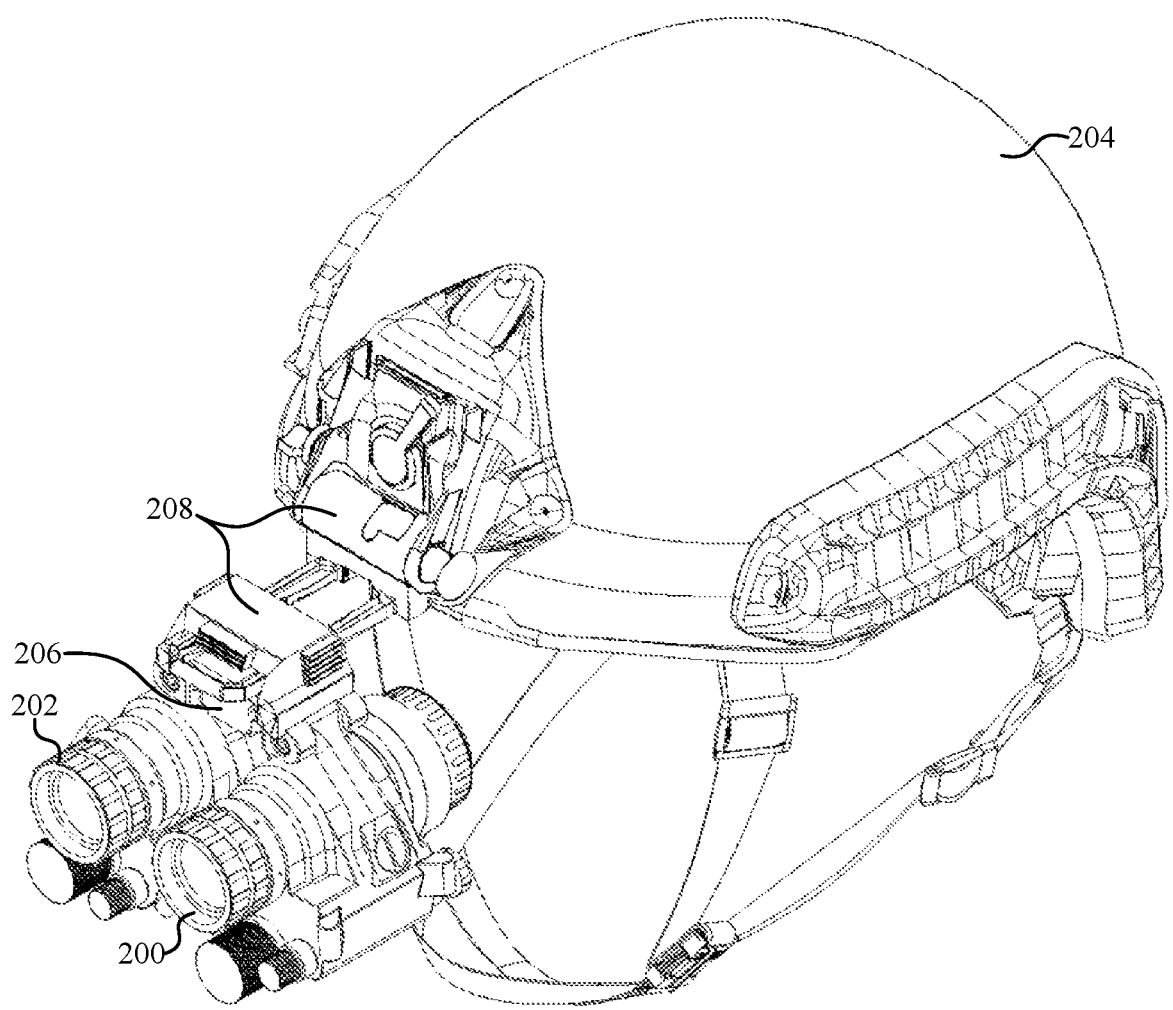
FIG. 2 is a perspective view of viewing devices mounted to a ballistic helmet by an adjustable mount.

FIG. 2 shows a perspective view of a first viewing device 200 and a second viewing device 202 mounted to a ballistic helmet 204 by an adjustable mount 206. Specifically, mount 206 is detachably mounted to a receiving carriage 208 of helmet 204 which, in this example, is a Wilcox L4 G24 NVG helmet mount. Each of viewing devices 200 and 202 is an independent, vision-enhancing unit (e.g., image intensifying night vision monocular, thermographic camera, etc.) removably mounted to a respective one of two sides of mount 206. In this example, mount 206 is shown in a fully deployed position wherein each of viewing devices 200 is positioned in front of a respective one of the user's eyes. However, as will be described with reference to upcoming figures, mount 206 is configured to be transitioned between fully deployed positions, partially deployed positions, and fully stowed positions. In a partially deployed position, only one of viewing devices 200 is positioned in front of a respective one of the user's eyes, while the other is folded upward, out of the line of sight of the other one of the user's eyes. In a fully stowed position, mount 206 is in a position where both of viewing devices 200 and 202 are folded upward and out of the lines of sight of both of the user's respective eyes. Optionally, receiving carriage 208 may be folded upward into a stowed position, wherein both viewing devices 200 are pointed substantially upward and, therefore, out of the lines of sight of the user.

Figure 3A:
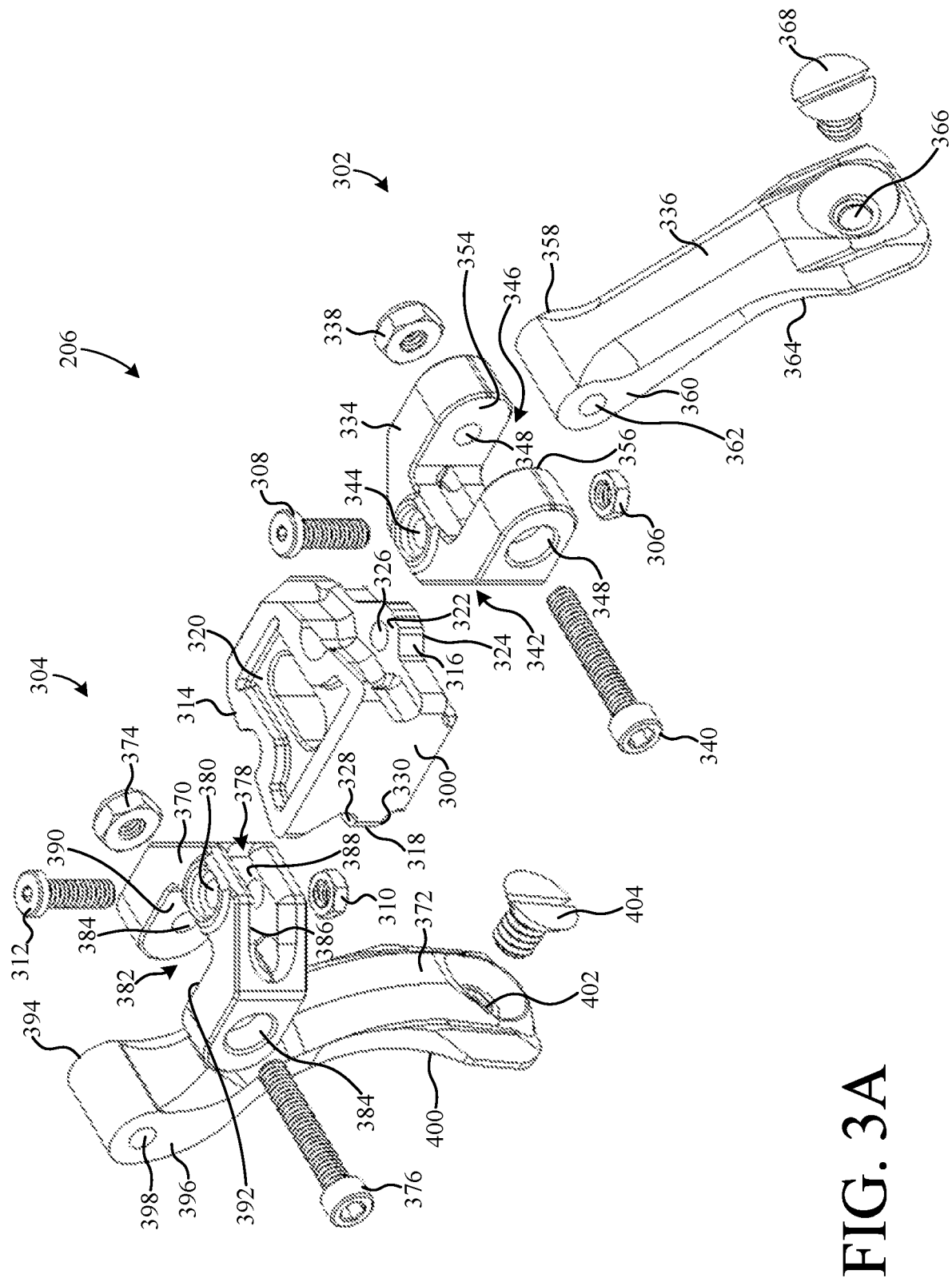
FIG. 3A is a front, exploded, perspective view of the adjustable mount of FIG. 2.
Figure 3B:
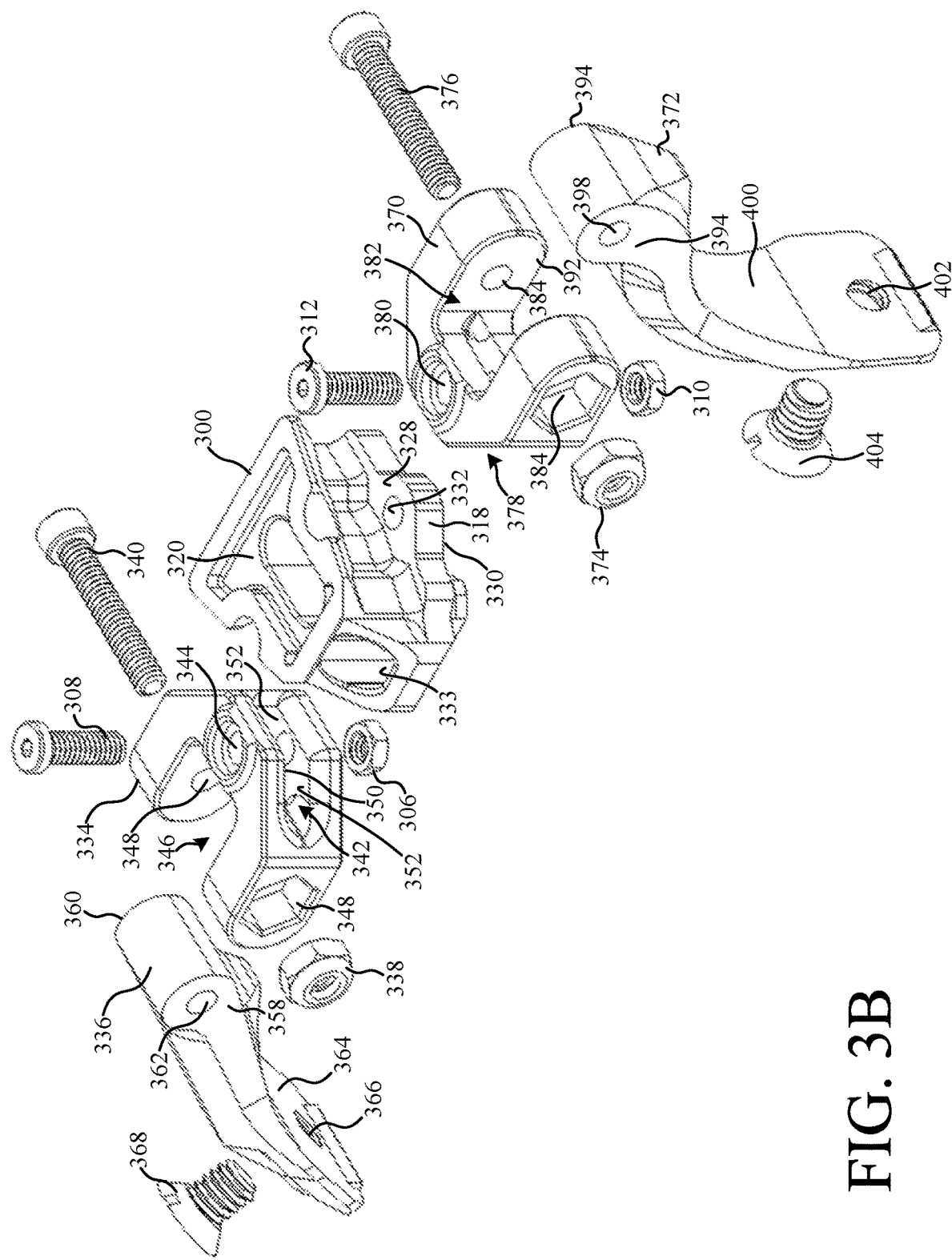
FIG. 3B is a rear, exploded, perspective view of the adjustable mount of FIG. 2.

FIGS. 3A and 3B are exploded, front and rear perspective views, respectively, of mount 206, detached from receiving carriage 208 and viewing devices 200. Mount 206 includes a central base 300, a first articulating arm assembly 302, and a second articulating arm assembly 304. When mount 206 is assembled, articulating arm assemblies 302 and 304 are pivotally coupled to a respective opposite side of base 300 by a first nut 306 and bolt 308, and a second nut 310 and bolt 312, respectively.

Base 300 is a monolithic structure defining a plurality of features, including a tapered dovetail feature 314, a first protrusion 316, and a second protrusion 318. Dovetail feature 314 facilitates the removable attachment of mount 206 to receiving carriage 208 (shown in FIG. 2). As used herein, the adjective monolithic means cast, molded, or otherwise formed as a single piece, or machined or cut from a single piece of material. The top surface of dovetail feature 314 defines recess 320 configured to engage a locking mechanism (not shown) of receiving carriage 208. When the locking mechanism of receiving carriage 208 engages the sidewalls defining recess 320, base 300 remains fixed to carriage 208. When the locking mechanism of receiving carriage 208 disengages the sidewalls of recess 320 by, for example, pressing a button on receiving carriage 208, base 300 can be separated from receiving carriage 208 by pulling them apart. First protrusion 316 includes a top planar surface 322, a parallel bottom planar surface 324, and a cylindrical aperture 326 passing perpendicularly therethrough. Likewise, second protrusion 318 includes a top planar surface 328, a parallel bottom planar surface 330, and a cylindrical aperture 332 passing perpendicularly therethrough. Apertures 326 and 332 are configured to receive bolt 308 and 312, respectively. The rear of base 300 also defines an aperture 333 configured to receive a lanyard.

First articulating arm assembly 302 includes a first member 334 and a second member 336 pivotally coupled together via a nut 338 and bolt 340. In this example, the proximal end of first articulating arm assembly 302 is located on first member 334 and the distal end of first articulating arm assembly 302 is located on second member 336. The proximal end of first articulating arm assembly 302 is configured to be coupled to base 300, and the distal end of first articulating arm assembly 302 is configured to be coupled to viewing device 200.

First member 334 is a monolithic structure defining a first yoke 342, having a first aperture 344 passing therethrough, and a second yoke 346, having a second aperture 348 passing therethrough. Yoke 342 includes a first interior planar surface 350 and a second interior planar surface 352 configured to frictionally engage top planar surface 322 and bottom planar surface 324, respectively, of first protrusion 316 of base 300. Accordingly, planar surface 322 of base 300, planar surface 324 of base 300, planar surface 350 of yoke 342, and planar surface 352 of yoke 342 maintain a parallel relationship with one another when articulating arm assembly 302 is assembled. Aperture 344 extends completely through yoke 342, perpendicular to planar surfaces 322, 324, 350, and 352. Yoke 346 includes a first interior planar surface 354 and a second interior planar surface 356, both of which are parallel to one another. Aperture 348 extends completely through yoke 346, perpendicular to planar surfaces 354 and 356.

Second member 336 is a monolithic structure defining a first side planar surface 358, a second side planar surface 360, a cylindrical aperture 362, a radial surface 364, and a threaded aperture 366. Planar surfaces 358 and 360 are parallel to one another and configured to frictionally engage planar surface 354 and 356, respectively, of yoke 346. Accordingly, planar surfaces 354, 356, 358, and 360 maintain a parallel relationship with one another when mount 206 is assembled. Aperture 362 extends perpendicularly through planar surfaces 358 and 360 and is configured to be coaxially aligned with aperture 348 of yoke 346, such that bolt 340 is simultaneously disposed through apertures 362 and 348 when mount 206 is assembled. Accordingly, bolt 308 and bolt 340 maintain a perpendicular relationship when mount 206 is assembled. Radial surface 364 is contoured to receive the radial exterior surface of viewing device 200. Threaded aperture 366 is configured to engage the threads of a standard screw 368, which is configured to thread into a standard complementary threaded mounting aperture (not shown) of viewing device 200, to facilitate the mounting of viewing device 200 to second member 336.

Second articulating arm assembly 304 includes a first member 370 and a second member 372, which are pivotally coupled together via a nut 374 and bolt 376. In this example, the proximal end of second articulating arm assembly 304 is located on first member 370, and the distal end of second articulating arm assembly 304 is located on second member 372. The proximal end of second articulating arm assembly 304 is configured to be coupled to base 300, and the distal end of second articulating arm assembly 304 is configured to be coupled to viewing device 202.

First member 370 is a monolithic structure defining a first yoke 378, having a first aperture 380 passing therethrough, and a second yoke 382, having a second aperture 384 passing therethrough. Yoke 378 includes a first interior planar surface 386 and a second interior planar surface 388, which are configured to frictionally engage top planar surface 328 and bottom planar surface 330, respectively, of second protrusion 318 of base 300. Accordingly, planar surface 328 of base 300, planar surface 330 of base 300, planar surface 386 of yoke 378, and planar surface 388 of yoke 378 maintain a parallel relationship with one another when articulating arm assembly 304 is assembled. Aperture 380 extends completely through yoke 378, in a direction perpendicular to planar surfaces 328, 330, 386, and 388. Yoke 382 includes a first interior planar surface 390 and a second interior planar surface 392, which are parallel to one another. Aperture 384 extends completely through yoke 382, in a direction perpendicular to planar surfaces 390 and 392.

Second member 372 is a monolithic structure, defining a first side planar surface 394, a second side planar surface 396, a cylindrical aperture 398, a radial surface 400, and a threaded aperture 402. Planar surfaces 394 and 396 are parallel to one another and configured to frictionally engage planar surfaces 390 and 392, respectively, of yoke 382. Accordingly, planar surfaces 390, 392, 394, and 396 maintain a parallel relationship with one another when mount 206 is assembled. Aperture 398 extends perpendicularly through planar surfaces 394 and 396 and is configured to be coaxially aligned with aperture 384 of yoke 382, such that bolt 376 can be simultaneously disposed through apertures 398 and 384 when mount 206 is assembled. Accordingly, bolts 312 and 376 maintain a perpendicular relationship when mount 206 is assembled. Radial surface 400 is contoured to receive the radial exterior surface of viewing device 202. Threaded aperture 402 is configured to engage the threads of a standard screw 404, which is configured to thread into a standard complementary threaded mounting aperture (not shown) of viewing device 202, to facilitate the mounting of viewing device 202 to second member 372.

The open ends of apertures 344, 348, 380, and 384 are all recessed (e.g., counter-sunk) to seat the heads of bolts 308, 312, 340, and 376, and also to seat nuts 306, 310, 338, and 374. The open ends of apertures 344, 348, 380, and 384 that seat nuts 306, 310, 338, and 374 are shaped to engage nuts 306, 310, 338, and 374, so that they don't rotate when bolts 308, 312, 340, and 376 are threaded therein.

Although bolts 308, 312, 340, and 376 are shown in this example as fully threaded fasteners, it should be understood that partially threaded fasteners, smooth-capped fasteners, hinge pins, or any other type of coupling that provides the desired rotational relationship can be used.

Figure 4:
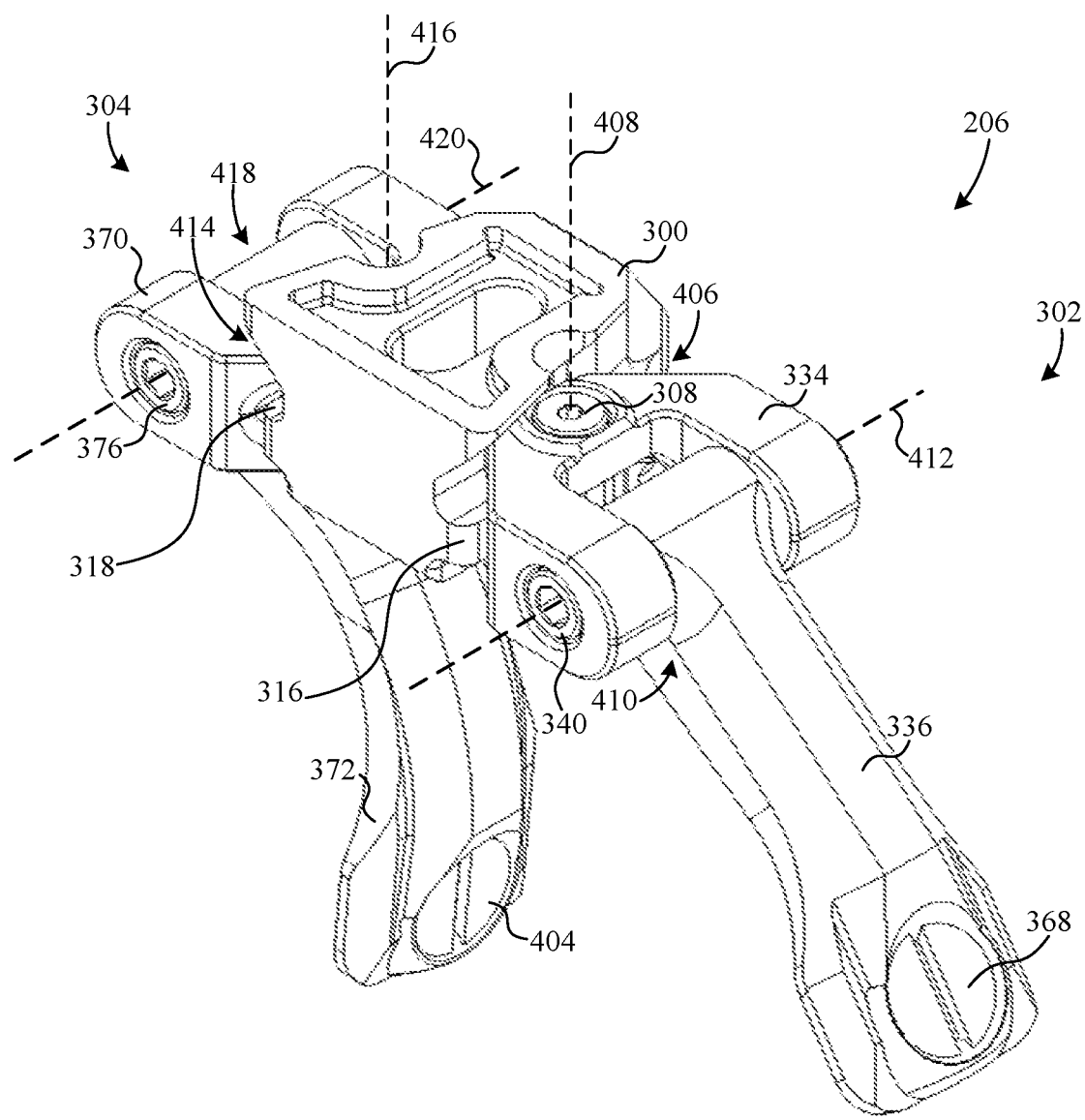
FIG. 4 is a perspective view of the adjustable mount of FIG. 2 assembled.

FIG. 4 is a perspective view of mount 206 assembled. In the following description of FIG. 4, reference is made to previous FIGS. 3A and 3B to view details not visible in the view of FIG. 4. Protrusion 316 of base 300 is inserted into yoke 342 of member 334. With apertures 326 and 344 (visible in FIG. 3A) coaxially aligned, bolt 308 is disposed therethrough and threaded into nut 306 (visible in FIG. 3A), thereby forming a first joint 406 of articulating arm assembly 302. First joint 406 allows member 334 to rotate about an axis 408 that is coaxial with bolt 308. The rotation of member 334 allows adjustment of the angular orientation of an optical axis of viewing device 200 with respect to a sagittal plane (shown in FIG. 5) passing through base 300. For example, viewing device 200 can be directed outward, away from the sagittal plane, which is also away from viewing device 202.

Aperture 348 of member 334 is coaxially aligned with aperture 362 of member 336. With apertures 348 and 362 coaxially aligned, bolt 340 can be disposed therethrough and threaded into nut 338, thereby forming a second joint 410 of articulating arm assembly 302. Second joint 410 allows member 336 to rotate about an axis 412 that is coaxial with bolt 340 and perpendicular to axis 408, which allows viewing device 200 to be transitioned between a stowed position and a deployed position (e.g., translated down into the line of sight of a user). Screw 368 is threaded into aperture 366 and passes completely through surface 364 (visible in FIG. 3B), so that it can be threaded into a complementary threaded aperture of a viewing device.

Protrusion 318 of base 300 is inserted into yoke 378 (visible in FIG. 3A) of member 370. With apertures 332 and 380 coaxially aligned, bolt 312 (shown in FIG. 3A) can be disposed therethrough and threaded into nut 310 (shown in FIG. 3A), thereby forming a first joint 414 of articulating arm assembly 304. First joint 414 allows member 370 to rotate about an axis 416 that is coaxial with bolt 312 (visible in FIG. 3A). The rotation of member 370 allows adjustment of the angle of an optical axis of viewing device 202 with respect to the sagittal plane passing through base 300. For example, the optical axis of viewing device 202 can be directed away from the sagittal plane, which is also away from viewing device 200.

Aperture 384 of member 370 is coaxially aligned with aperture 398 of member 372. With apertures 384 and 398 coaxially aligned, bolt 376 can be disposed therethrough and threaded into nut 374 (visible in FIG. 3A), thereby forming a second joint 418 of articulating arm assembly 304. Second joint 418 allows member 372 to rotate about an axis 420 that is coaxial with bolt 376 and perpendicular to axis 416, which allows viewing device 202 to be transitioned between a stowed position and a deployed position. Screw 404 is threaded into aperture 402 and passes completely through radial surface 400 (visible in FIG. 3A) so that it can be threaded into a complementary threaded aperture of a viewing device.

When the user puts a viewing device in a preferred position, the friction in the joints of the hosting arm assembly is sufficient to hold the viewing device in that position. For example, the friction between surface 322 of base 300 and surface 350 of member 334 in combination with the friction between surface 324 of base 300 and surface 352 of member 334 is such that joint 406 may be articulated by the force applied by a user's hand, but then maintains its position (against inertial and gravitation forces) until forcefully adjusted by the user again. The same applies to the remaining three joints 410, 414, and 418. That is, the friction between surface 354 of member 334 and surface 358 of member 336 in combination with the friction between surface 356 of member 334 and surface 360 of member 336 is such that joint 410 may be articulated by force applied by a user's hand, but then maintains its position until forcefully adjusted by the user again. Likewise, the friction between surface 328 of base 300 and surface 386 of member 370 in combination with the friction between surface 330 of base 300 and surface 388 of member 370 is such that joint 414 may be articulated by force applied by a user's hand, but then maintains its position until forcefully adjusted again by the user's again. Finally, the friction between surface 390 of member 370 and surface 394 of member 372 in combination with the friction between surface 392 of member 370 and surface 396 of member 372 is such that joint 418 may be articulated by force applied by a user's hand, but then maintains its position until forcefully adjusted by the user again.

Figure 5A:
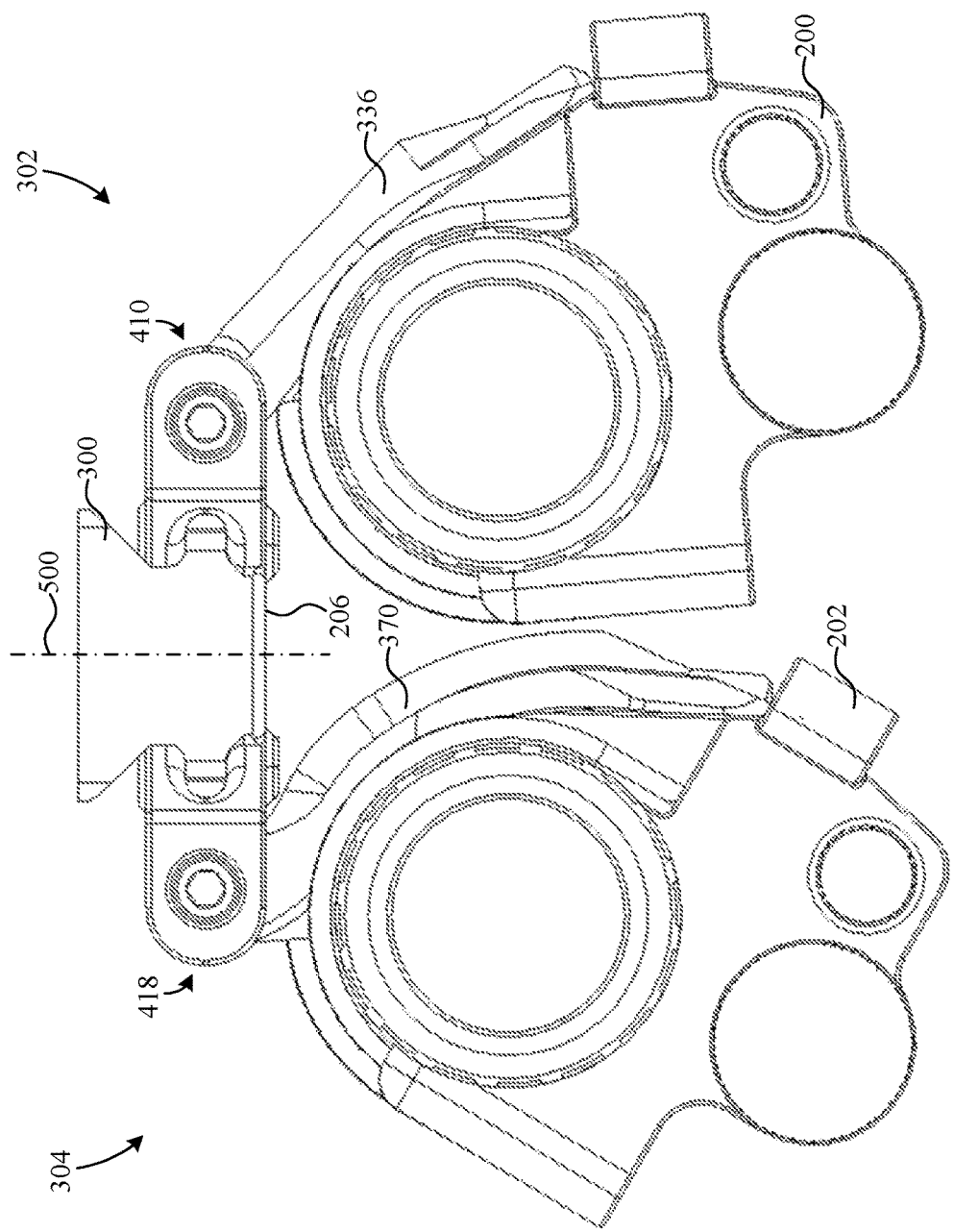
FIG. 5A is a front view of the mount and viewing devices of FIG. 2 in a fully deployed position.
Figure 5B:
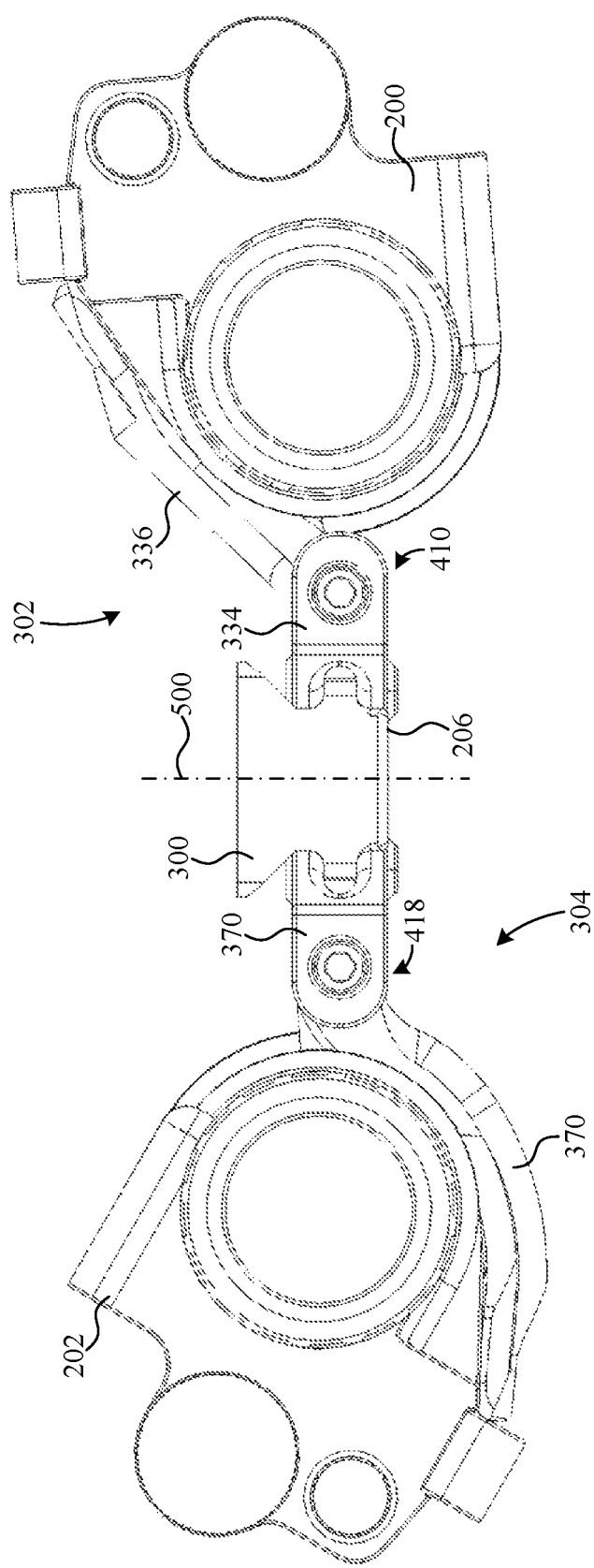
FIG. 5B is a front view of the mount and viewing devices of FIG. 2 in a fully stowed position.

FIGS. 5A and 5B show front views of mount 206 in a fully deployed position and in a fully stowed position, respectively. In the fully deployed position, as illustrated in FIG. 5A, both members 336 and 370 are rotated downward, so that viewing devices 200 and 202 are disposed in front of the user's left and right eyes, respectively. In the fully stowed position, as illustrated in FIG. 5B, both members 336 and 370 are rotated up and away from a central sagittal plane 500 passing symmetrically through base 300, so that neither of the user's naked eyes are obstructed by viewing devices 200 and 202. The transition of viewing device 200 between a deployed position and a stowed position is done by articulating joint 410. The transition of viewing device 202 between a deployed position and a stowed position is done by articulating joint 418. The position of viewing device 200 does not depend on the position of viewing device 202. Likewise, the position of viewing device 202 does not depend on the position of viewing device 200. For example, one of viewing devices 200 and 202 may be deployed while the other is stowed.

Figure 6A:
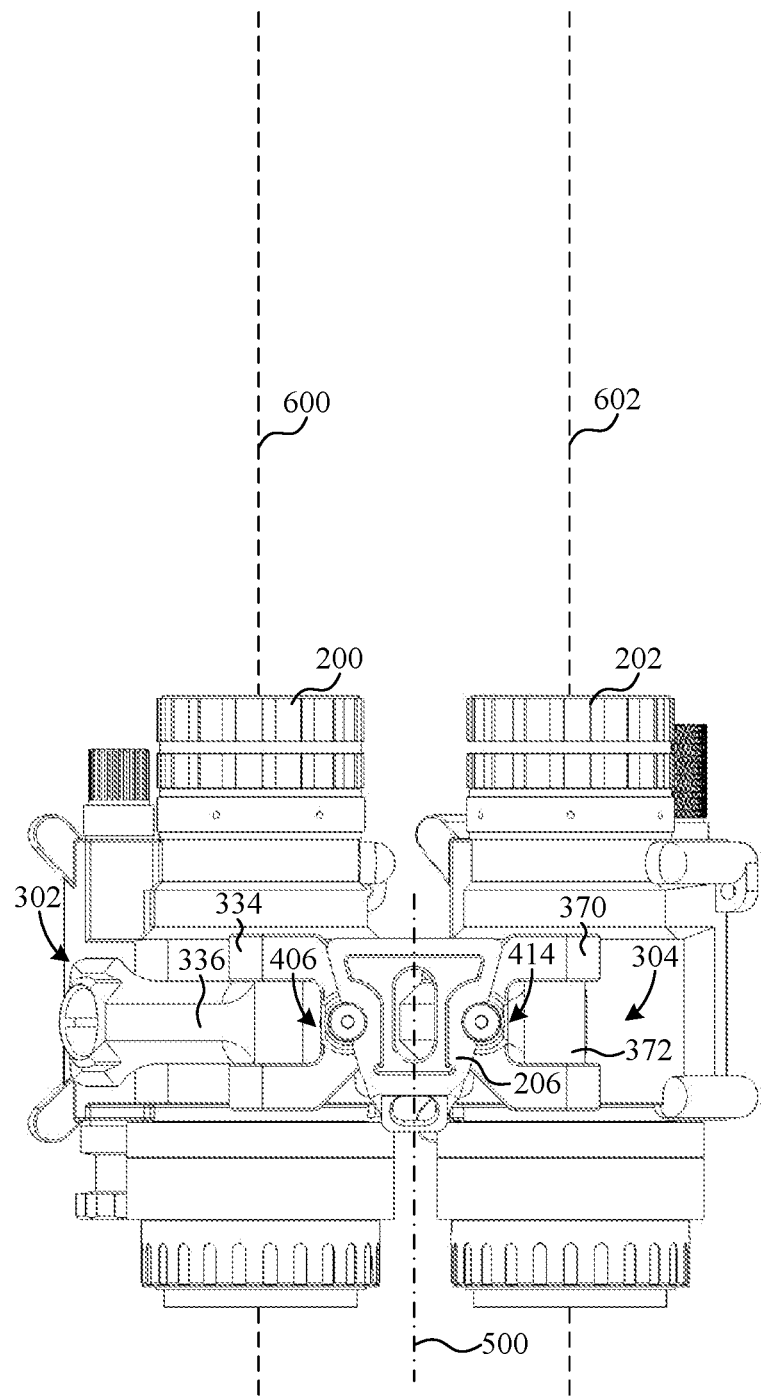
FIG. 6A is a top view of the mount and viewing devices of FIG. 2 of FIG. 2 in a forward position.

FIG. 6A shows a top view of mount 206 in a fully deployed configuration, with the optical axis 600 of viewing device 200 and the optical axis 602 of viewing device 202 pointing slightly inward toward sagittal plane 500, nearly parallel to one another. In this particular embodiment, arm assemblies 302 and 304 are fully rotated forward at joints 406 and 414, respectively. However, arm assemblies 302 and 304 may optionally have ranges of motion about axes 408 and 416, respectively, that permit optical axes 600 and 602 to point even more inwardly toward sagittal plane 500.

Figure 6B:
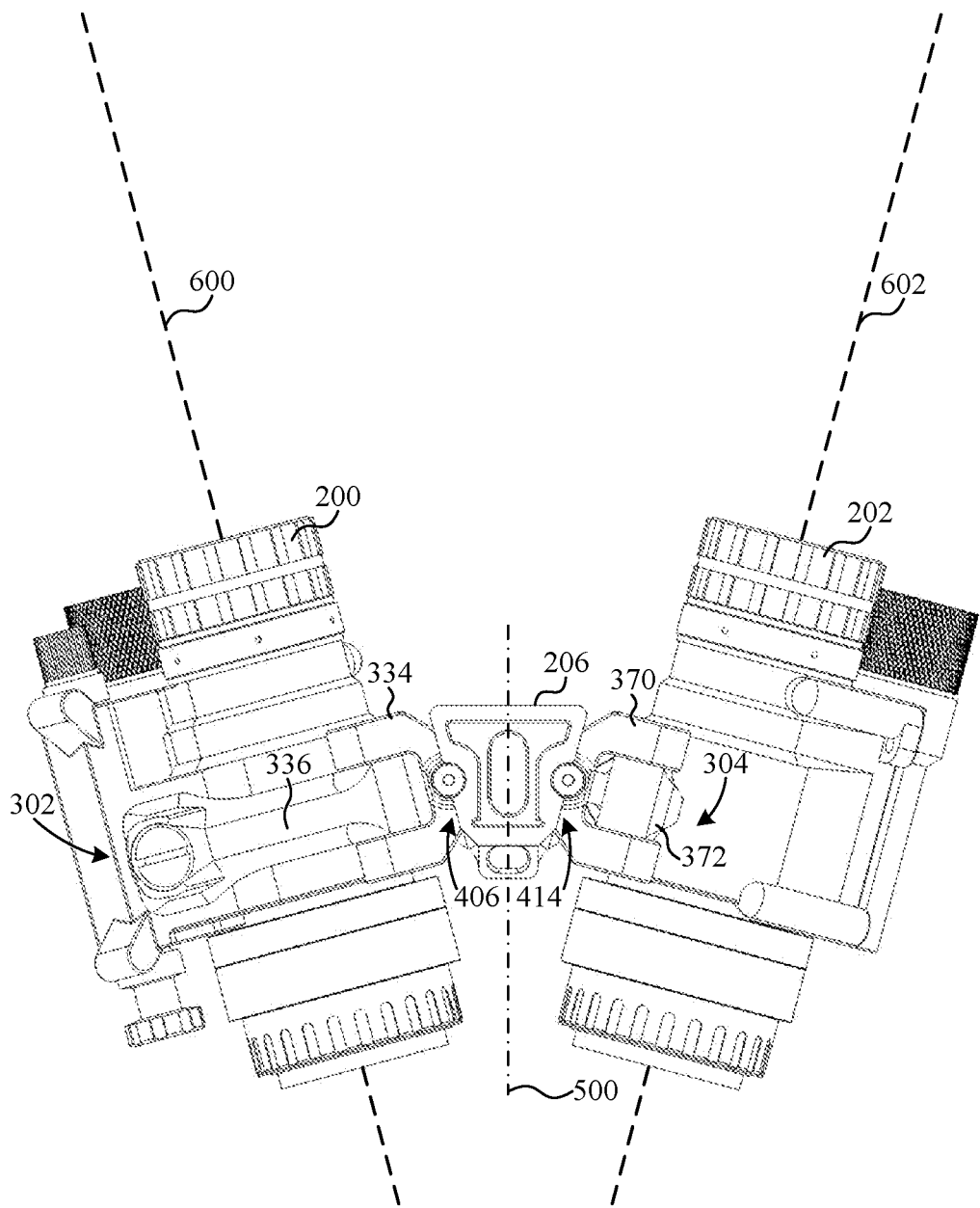
FIG. 6B is a top view of the mount and viewing devices of FIG. 2 in an outward position.

FIG. 6B shows a top view of mount 206 in a fully deployed configuration, with optical axis 600 of viewing device 200 and optical axis 602 of viewing device 202 pointing outward, away from sagittal plane 500. In this particular configuration, arm assemblies 302 and 304 are rotated outward at joints 406 and 414, respectively. When members 334 and 370 are rotated outward, the user may look through the space between viewing devices 200 and 202 with one naked eye, while the other eye looks through one of viewing devices 200 and 202. As previously mentioned, the positions of arm assemblies 302 and 304 do not depend on one another. Accordingly, one of viewing devices 200 and 202 may be pointed toward sagittal plane 500 while the other is pointed away from sagittal plane 500.

Figure 1:
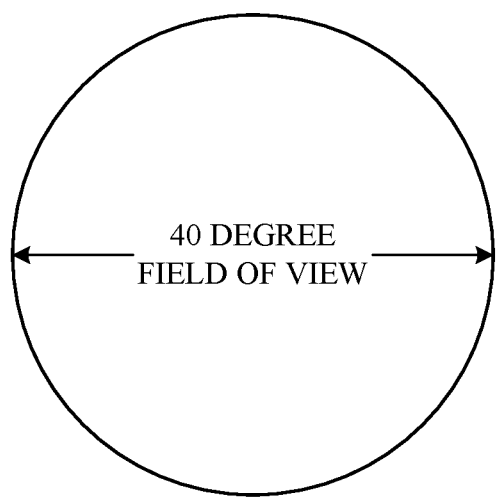
FIG. 1 shows a prior art field of view.
Figure 7:
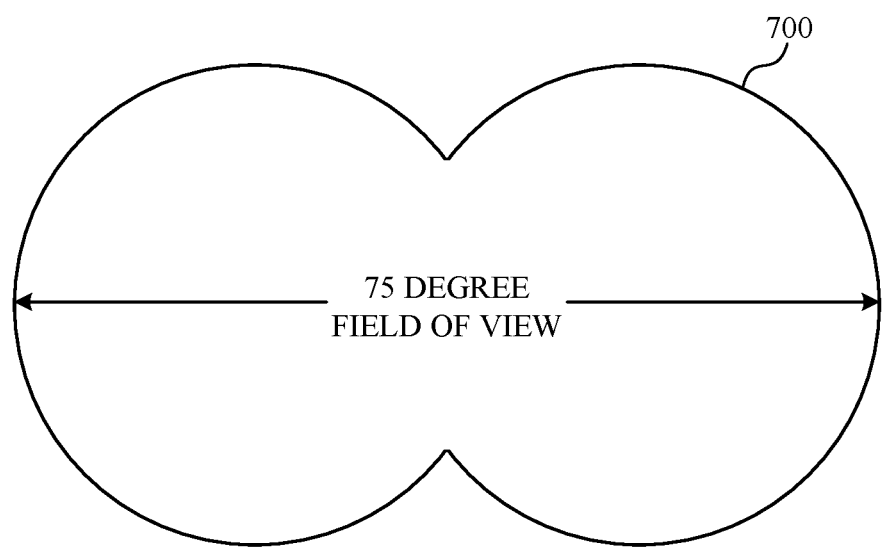
FIG. 7 shows the combined field of view of the viewing devices of FIG. 2, when the adjustable mount of FIG. 2 is in a forward position.

FIG. 7 shows the combined field of view (FOV) 700 of viewing devices 200 and 202 when mount 206 is in the configuration shown in FIG. 6A. As shown, FOV 700 is substantially greater than prior art field of view 100 of FIG. 1. Specifically, FOV 700 is a seventy-five degree field of view.

Figure 8:
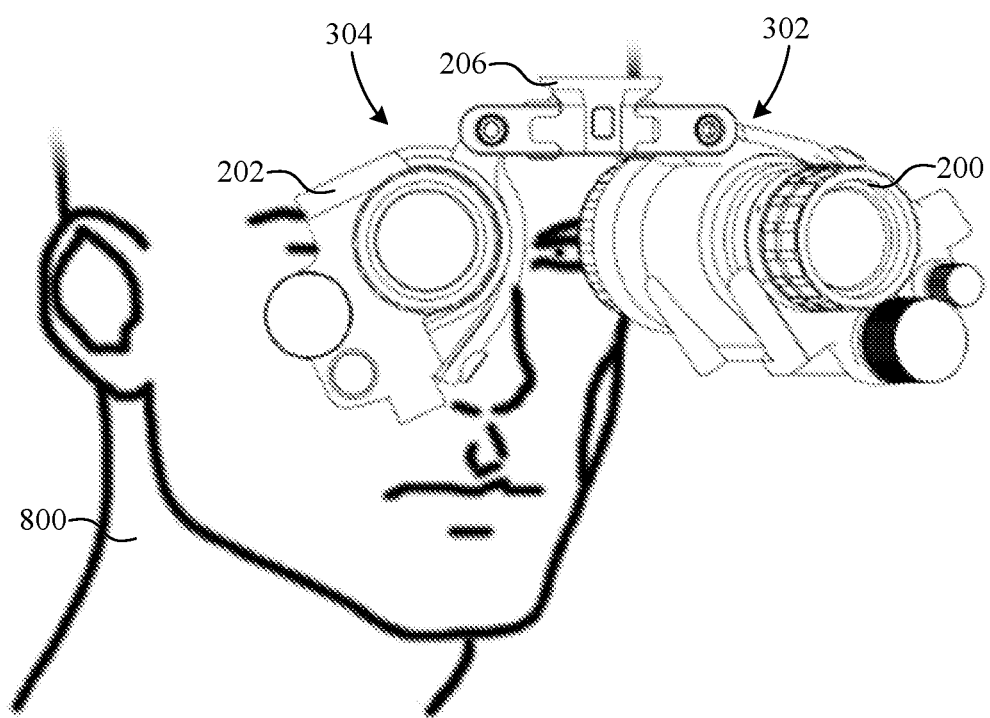
FIG. 8 is a front view of the adjustable mount of FIG. 2 disposed in front of a user with one of the viewing devices pointing outward and the other pointing straight forward.

FIG. 8 shows a front view of mount 206 disposed in front of a user 800. Helmet 204 is withheld from FIG. 8 for clarity. As shown, arm assembly 304 is in a deployed position, with viewing device 202 in a straight forward position, while arm assembly 302 is in a deployed position, with viewing device 200 pointed away from sagittal plane 500. When mount 206 is in this particular configuration, the right eye of user 800 may look through viewing device 202 while the naked left eye looks through the space between viewing devices 200 and 202. Without moving mount 206, the left eye of user 800 may optionally turn left and look through viewing device 200.

Figure 9:
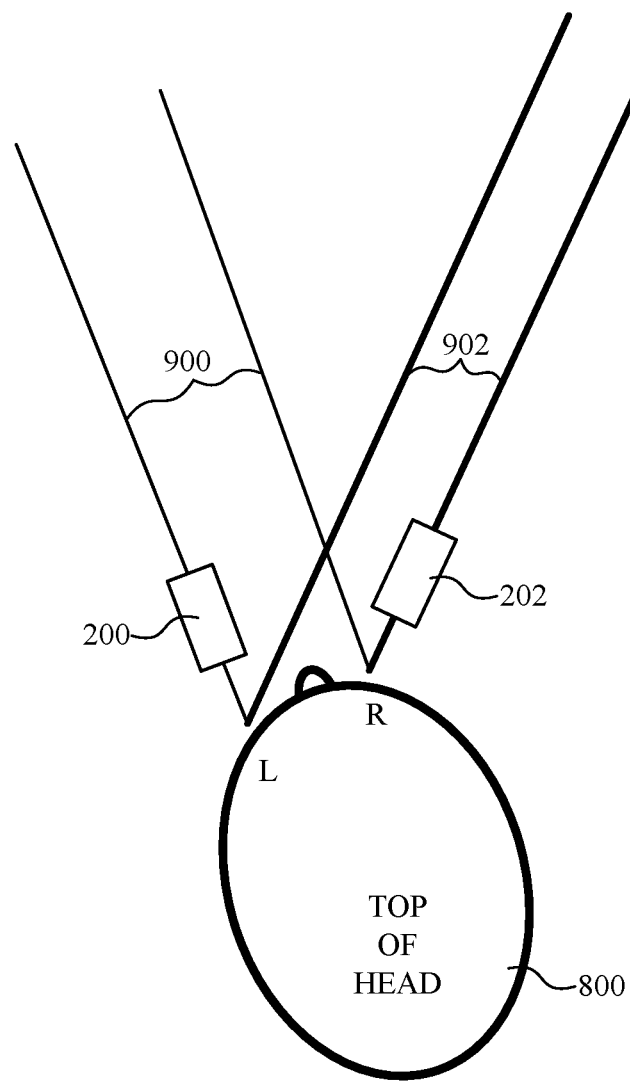
FIG. 9 is a diagrammatic top view of the adjustable mount of FIG. 2 disposed in front of a, with one of the viewing devices pointing outward and the other pointing straight forward.

FIG. 9 is a top view of user 800 and viewing devices 200 and 202, when mount 206 is in the configuration shown in FIG. 8. In a first scenario, with the user's lines of sight 900 depicted by thin lines, the left eye of user 800 looks through viewing device 200, while the naked right eye looks through the space between viewing devices 200 and 202. In a second scenario, with the user's shifted lines of sight 902 depicted by thick lines, the right eye of user 800 looks through viewing device 202, while the naked left eye looks through the space between viewing devices 200 and 202.

In FIG. 9, the outward angle of viewing device 202 is exaggerated for illustrative purposes. In a typical practical application, viewing devices 200 and 202 could each be directed outwardly at an angle in the range of 7°-12° (for a total angle between the optical axes of viewing devices 200 and 202 in the range of (14°-24°), which would provide enough separation between viewing devices 200 and 202 for an unobstructed line of sight. The practical limit for the outward rotation of an optical device that could still be comfortably used is about 15°. However, alternate mounts can allow more outward rotation if desirable and, again, the outward adjustment of viewing device 200 is independent of the outward adjustment of viewing device 202.

Figure 10:
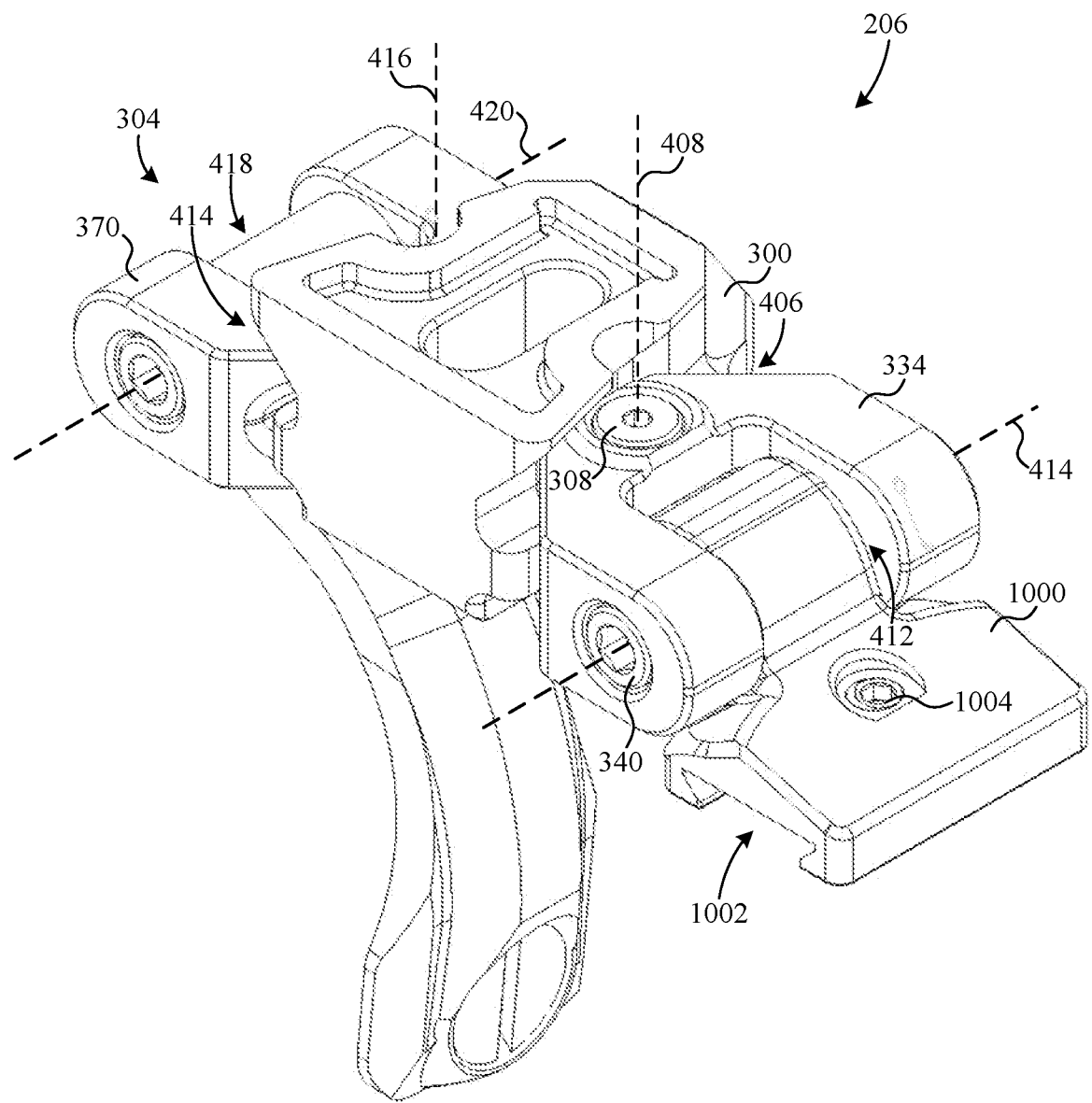
FIG. 10 is a perspective view of an alternate adjustable mount.

FIG. 10 is a perspective view of mount 206 having an alternate member 1000 substituted for member 336. Alternate member 1000 functions similar to member 336 in terms of articulation at joints 406 and 410, however, is configured to receive alternate viewing devices such as, for example, thermographic cameras, digital ultra-low light cameras, and so on. Like member 336, member 1000 is configured to rotate about bolt 340 to facilitate the transitioning of a viewing device mounted to member 1000 between a deployed position and a stowed position. As is the case with member 336, the angle of the optical axis of the viewing device mounted to member 1000 with respect to sagittal plane 500 is adjustable by rotating member 334 about bolt 308. Member 1000 is a monolithic structure defining a dovetail channel 1002 and a mounting screw 1004. Dovetail channel 1002 is configured to receive a dovetail rail of a viewing device. Mounting screw 1004 is threaded through an aperture (not visible) that passes completely through member 1000 so that screw 1004 can be threaded into a complementary threaded mounting aperture of a viewing device seated in dovetail channel 1002. Although one alternate member 1000 is substituted for only one of members 336 and 372 in this embodiment, both members 336 and 372 may be replaced with a respective two members 1000, as particular circumstances make desirable.

Figure 11:
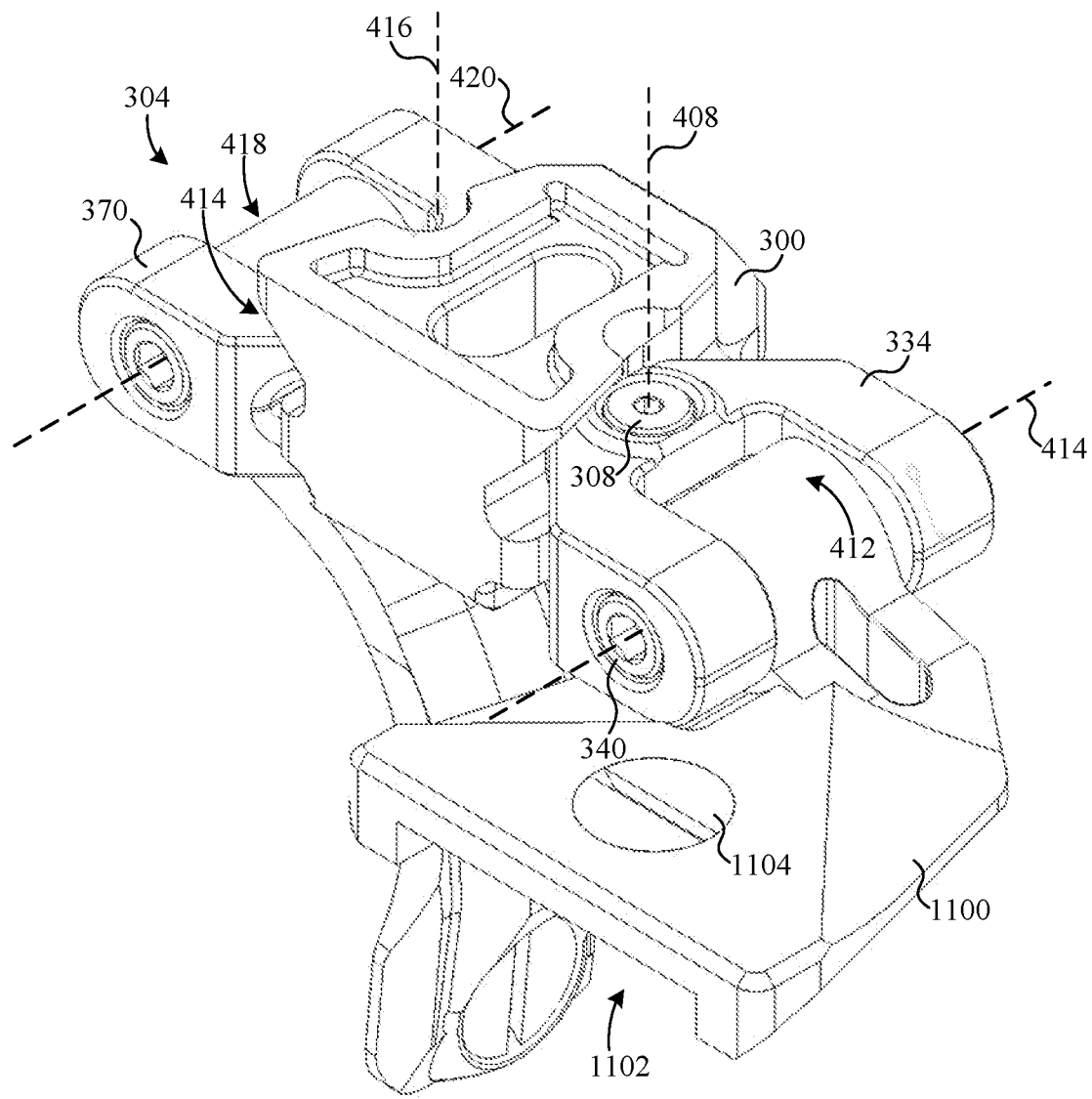
FIG. 11 is a perspective view of another alternate adjustable mount.

FIG. 11 shows a perspective view of mount 206 having an alternate member 1100 substituted for member 336. Alternate member 1100 functions similar to member 336 in terms of articulation at joints 406 and 410, however, is configured to receive alternate viewing devices such as, for example, thermographic cameras, digital ultra-low light cameras, and so on. Like member 336, member 1100 is configured to rotate about bolt 340 to facilitate the transitioning of a viewing device mounted to member 1100 between a deployed position and a stowed position. As is the case with member 336, the angle of the optical axis of the viewing device mounted to member 1100 with respect to sagittal plane 500 is adjustable by rotating member 334 about bolt 308. Member 1100 is a monolithic structure defining a recess 1102 and a mounting screw 1104. Recess 1102 is configured to seat a viewing device. Mounting screw 1104 is threaded through an aperture (not visible) that passes completely through member 1100, so that screw 1104 can be threaded into a complementary threaded mounting aperture of a viewing device seated in recess 1102. Although one alternate member 1100 is substituted for only one of members 336 and 372 in this embodiment, both members 336 and 372 may be replaced with a respective two members 1000, if desired.

Figure 12:
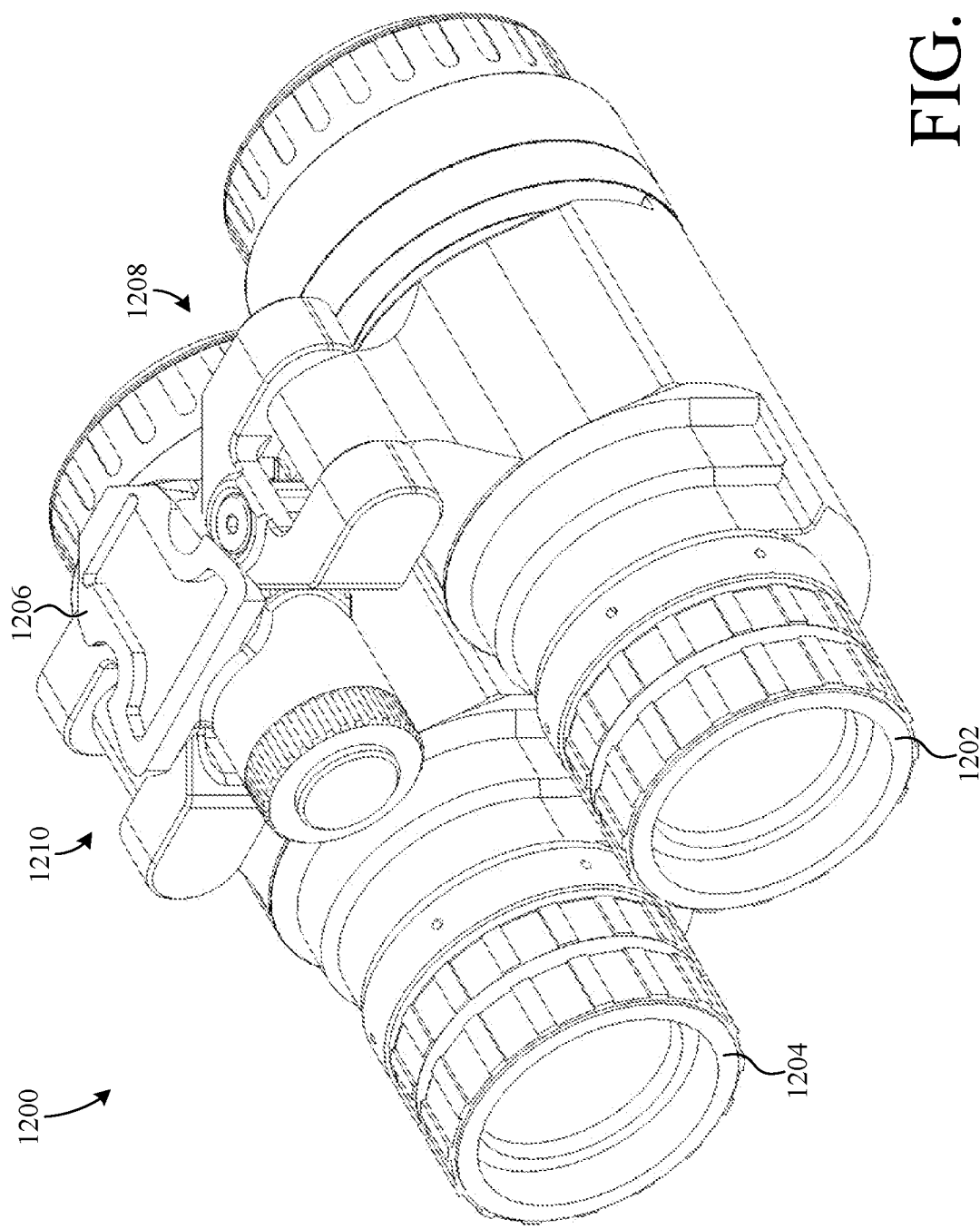
FIG. 12 is a perspective view of an alternate viewing device assembly.

FIG. 12 shows a perspective view of a powered viewing device assembly 1200 that may be used as a stand-alone device like, for example, a pair of binoculars, or may optionally be mounted to a helmet. Viewing device assembly 1200 includes two image intensifying monoculars 1202 and 1204, a base 1206, a first articulating arm assembly 1208, and a second articulating arm assembly 1210. Each of image intensifying monoculars 1202 and 1204 is pivotally coupled to a respective one of articulating arm assemblies 1208 and 1210. Each of articulating arm assemblies 1208 and 1210 is coupled to a respective side of base 1206.

Figure 13:
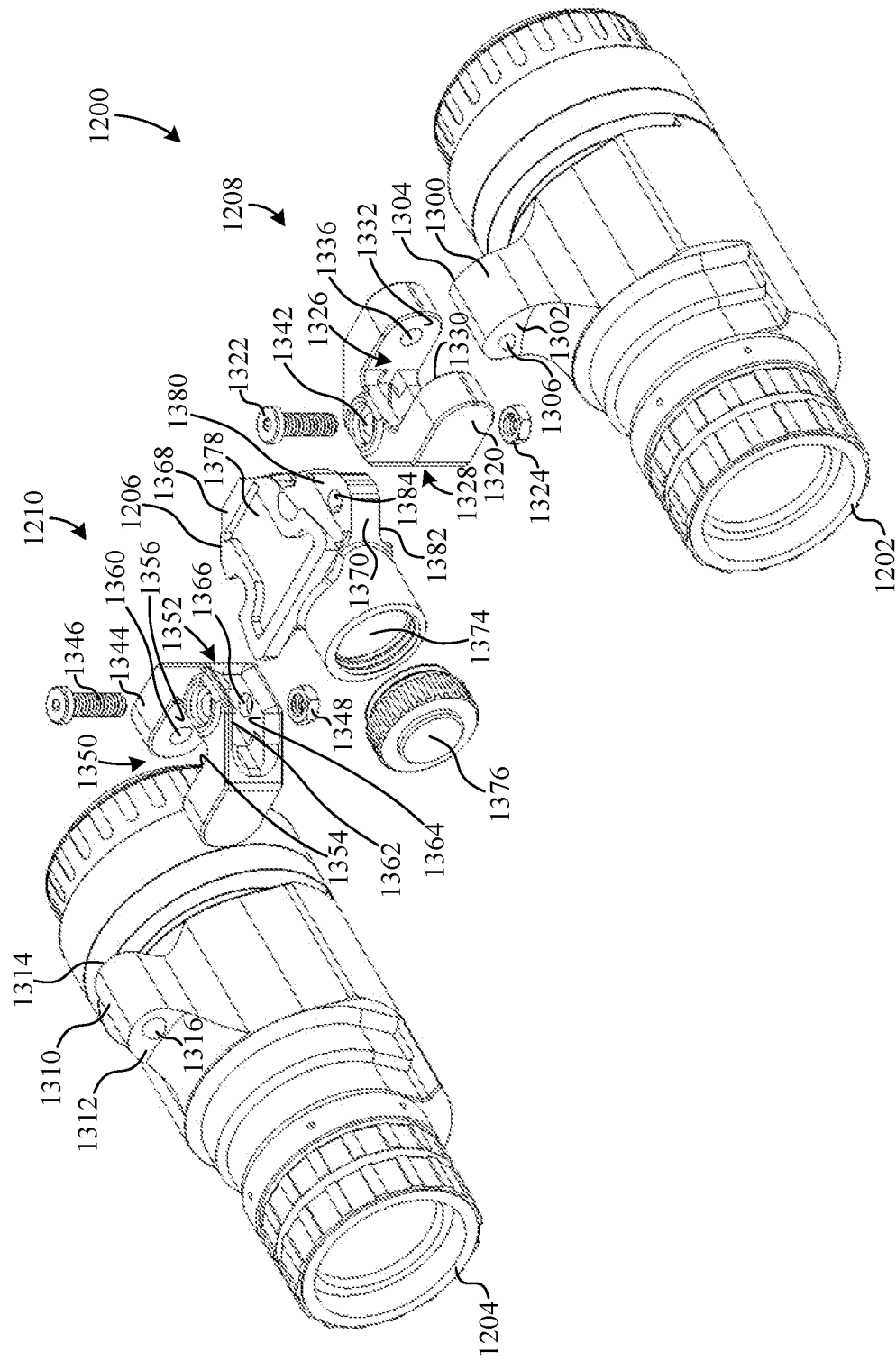
FIG. 13 is an exploded, perspective view of the viewing device assembly of FIG. 12.

FIG. 13 is an exploded perspective view of viewing device assembly 1200. In this example, each of viewing device assemblies 1200 is an image intensifying night vision monocular. However, alternate viewing devices may be substituted for the image intensifying night vision monoculars. The housing of image intensifying monocular 1202 includes an arm 1300 having a first side surface 1302 and an opposite second side surface 1304. Surface 1302 defines a first semi-spherical protrusion 1306, and surface 1304 defines a second semi-spherical protrusion 1308 (not visible). The housing of image intensifying monocular 1204 includes an arm 1310 having a first side surface 1312 and an opposite second side surface 1314. Surface 1312 defines a first semi-spherical protrusion 1316, and surface 1314 defines a second semi-spherical protrusion 1318 (not visible).

Articulating arm assembly 1208 includes a member 1320, a bolt 1322, and a nut 1324. Member 1320 is a monolithic structure defining a first yoke 1326 and a second yoke 1328. First yoke 1326 includes a first interior surface 1330 and an opposite second interior surface 1332, defining a first semi-spherical recess 1334 (not visible) and a second semi-spherical recess 1336, respectively. When assembled, surface 1330 of yoke 1326 frictionally engages surface 1302 of image intensifying monocular 1202, while protrusion 1306 is pivotally seated in recess 1334. Likewise, surface 1332 of yoke 1326 frictionally engages surface 1304 of image intensifying monocular 1202, while protrusion 1308 is pivotally seated in recess 1336. Image intensifying monocular 1202 may be pivoted between a stowed position and a deployed position by rotating image intensifying monocular 1202 about an axis passing through protrusions 1306 and 1308, and recesses 1334 and 1336. Second yoke 1328 is configured to be pivotally coupled to base 1206 by bolt 1322. Yoke 1328 defines an upper interior surface 1338 (not visible), a parallel lower interior surface 1340 (not visible), and an aperture 1342 passing perpendicularly therethrough.

Articulating arm assembly 1210 includes a member 1344, a bolt 1346, and a nut 1348. Member 1344 is a monolithic structure defining a first yoke 1350 and a second yoke 1352. First yoke 1350 includes a first interior surface 1354 and an opposite second interior surface 1356, defining a first semi-spherical recess 1358 (not visible) and a second semi-spherical recess 1360, respectively. When assembled, surface 1354 of yoke 1350 frictionally engages surface 1312 of image intensifying monocular 1204, while protrusion 1316 is pivotally seated in recess 1358. Likewise, surface 1356 of yoke 1350 frictionally engages surface 1314 of image intensifying monocular 1204, while protrusion 1318 (not shown) is pivotally seated in recess 1360. Image intensifying monocular 1204 may be pivoted between a stowed position and a deployed position by rotating image intensifying monocular 1204 about an axis passing through protrusions 1316 and 1318 and recesses 1358 and 1360. Second yoke 1352 is configured to be pivotally coupled to base 1206 by bolt 1346. Yoke 1352 defines an upper interior surface 1362, a parallel lower interior surface 1364, and an aperture 1366 passing perpendicularly therethrough. Aperture 1342 extends perpendicular to the axis extending through recesses 1334 and 1336. Likewise, aperture 1366 extends perpendicular to the axis extending through recesses 1358 and 1360. Because, in this embodiment, member 1344 is geometrically identical to member 1320, features that may not be visible on one of members 1344 and 1320 may be visible on the other.

Base 1206 facilitates the removable attachment of viewing device assembly 1200 to receiving carriage 208 (shown in FIG. 2) and is also configured to supply power to image intensifying monoculars 1202 and 1204. Base 1206 includes a tapered dovetail feature 1368, a first protrusion 1370, a second protrusion 1372 (not visible), a battery receptacle 1374, and a cap 1376. Dovetail feature 1368 facilitates the removable attachment of viewing device assembly 1200 to receiving carriage 208 (shown in FIG. 2). The top surface of dovetail feature 1368 defines a recess 1378 configured to engage a locking mechanism (not shown) of receiving carriage 208. First protrusion 1370 includes a top planar surface 1380, a parallel bottom planar surface 1382, and a cylindrical aperture 1384 passing perpendicularly therethrough. Likewise, second protrusion 1372 (not shown) includes a top planar surface 1386 (not shown), a parallel bottom planar surface 1388 (not shown), and a cylindrical aperture 1390 (not shown) passing perpendicularly therethrough. Apertures 1384 and 1390 are configured to receive bolts 1322 and 1346, respectively. When viewing device assembly 1200 is assembled, protrusions 1370 and 1772 are inserted into yokes 1328 and 1352, respectively. Furthermore, aperture 1342 of member 1320 is coaxially aligned with aperture 1384 of base 1206, and bolt 1322 is disposed through both apertures 1342 and 1384 to form a pivot joint. Likewise, aperture 1366 of member 1344 is coaxially aligned with aperture 1390 of base 1206, and bolt 1346 is disposed through both apertures 1366 and 1390 to form another pivot joint. Battery receptacle 1374 is configured to receive a battery such as, for example, a CR123A that supplies power to both image intensifying tubes inside image intensifying monoculars 1202 and 1204. Although not shown, power supply circuitry runs from battery receptacle 1374 to both image intensifying tubes inside image intensifying monoculars 1202 and 1204. This may be in the form of a flexible printed circuit (FPC), electrical contacts, flexible wires, and/or any other suitable means. Cap 1376 is configured to screw into receptacle 1374, to enclose one or more batteries therein, and also includes an integral push-button power switch 1392.

Figure 14A:
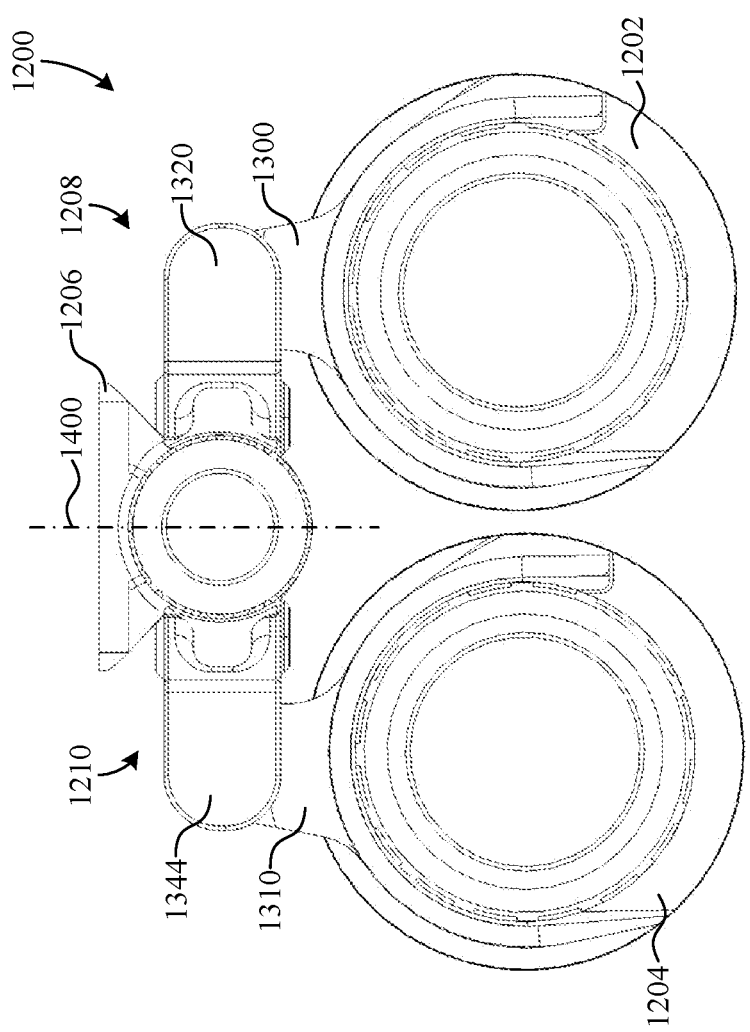
FIG. 14A is a front view of the viewing device assembly of FIG. 12, in a fully deployed position.
Figure 14B:
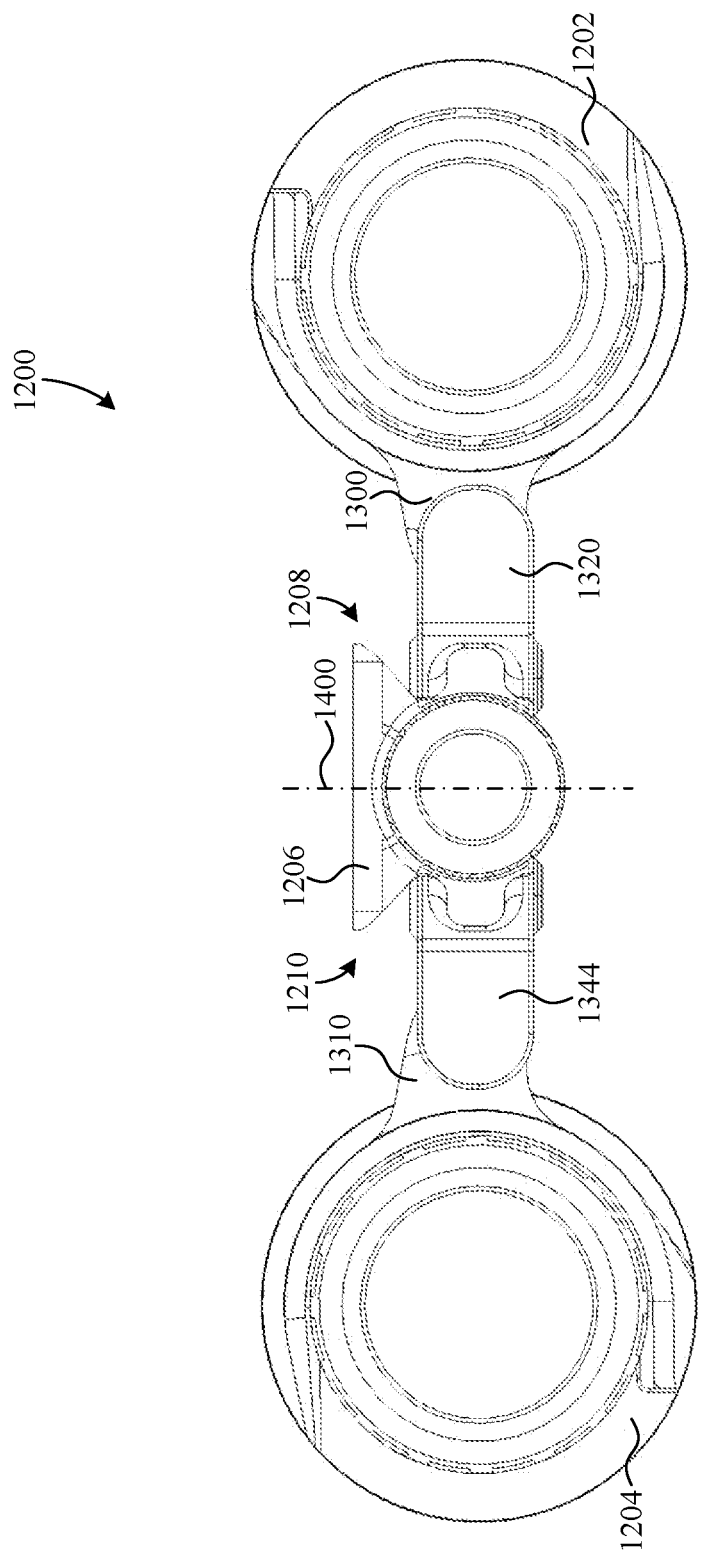
FIG. 14B is a front view of the viewing device assembly of FIG. 12, in a fully stowed position.

FIGS. 14A and 14B show front views of viewing device assembly 1200 in a fully deployed position and in a fully stowed position, respectively. In the fully deployed position, as illustrated in FIG. 14A, both image intensifying monoculars 1202 and 1204 are rotated downward such that image intensifying monoculars 1202 and 1204 are disposed in front of the user's left and right eyes, respectively. In the fully stowed position, as illustrated in FIG. 14B, both image intensifying monoculars 1202 and 1204 are rotated up and away from a central sagittal plane 1400 passing symmetrically through base 1206, so that neither of the user's naked eyes are obstructed by image intensifying monoculars 1202 and 1204. The transition of image intensifying monocular 1202, between a deployed position and a stowed position is done by rotating image intensifying monocular 1202 about the axis extending through recesses 1334 and 1336 (shown in FIG. 13). Similarly, the transition of image intensifying monocular 1204, between a deployed position and a stowed position, is done by rotating image intensifying monocular 1204 about the axis extending through recesses 1358 and 1360. The position of image intensifying monocular 1204 does not depend on the position of image intensifying monocular 1202. Likewise, the position of image intensifying monocular 1202 does not depend on the position of image intensifying monocular 1204. For example, one of image intensifying monocular 1202 and 1204 may be deployed, while the other is stowed.

Figure 15A:
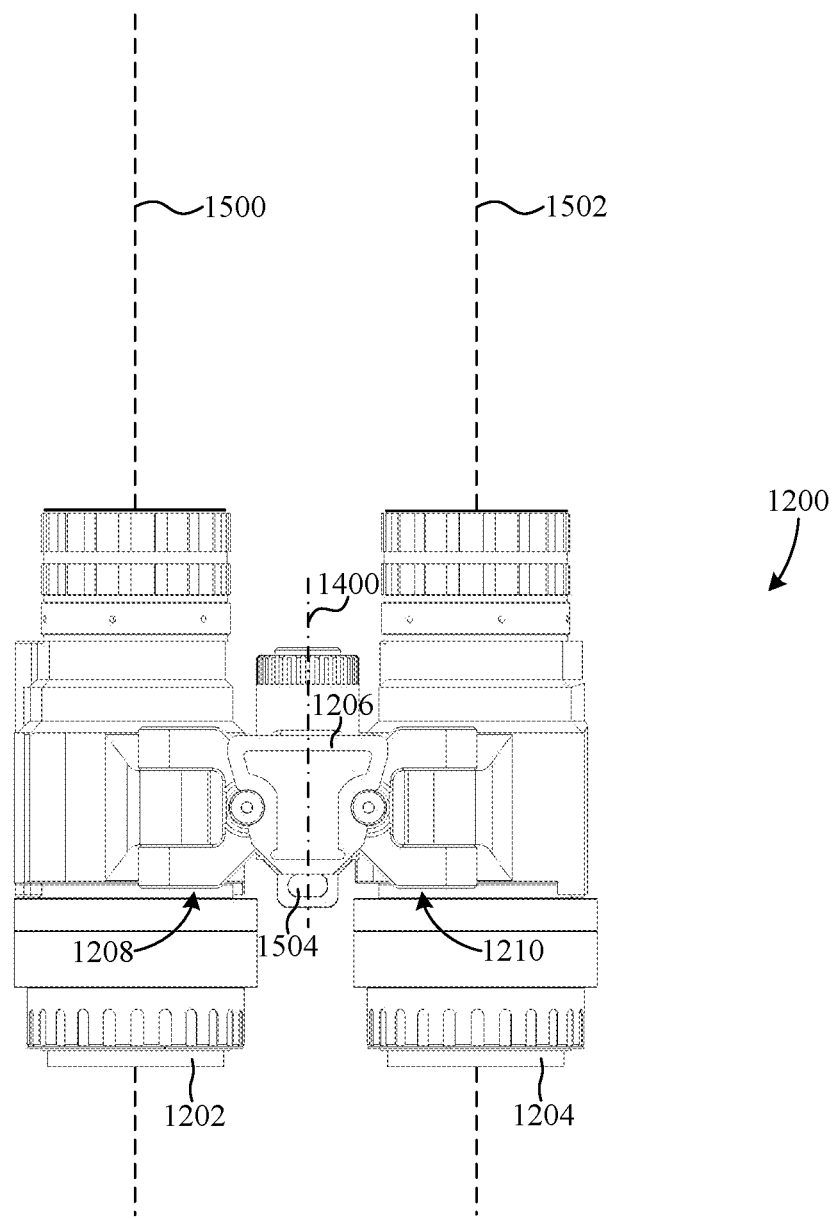
FIG. 15A is a top view of the viewing device assembly of FIG. 12, with the image intensifying monoculars in a forward position.

FIG. 15A is a top view of viewing device assembly 1200 in a fully deployed configuration, with the optical axis 1500 of image intensifying monocular 1202 and the optical axis 1502 of image intensifying monocular 1204 pointing slightly inward toward sagittal plane 1400, nearly parallel to one another. For example, optical axes 1500 and 1502 are angled inward such that image intensifying monoculars 1202 and 1204 have a combined FOV of approximately seventy five degrees. In this particular example embodiment, arm assemblies 1208 and 1210 are fully rotated forward about bolts 1322 and 1346, respectively. However, arm assemblies 1208 and 1210 may optionally be modified to have ranges of motion about bolts 1322 and 1346, respectively, that permit optical axes 1500 and 1502 to point even more inward, toward sagittal plane 1400. As shown, the rear of base 1206 also defines an aperture 1504 configured to receive a lanyard.

Figure 15B:
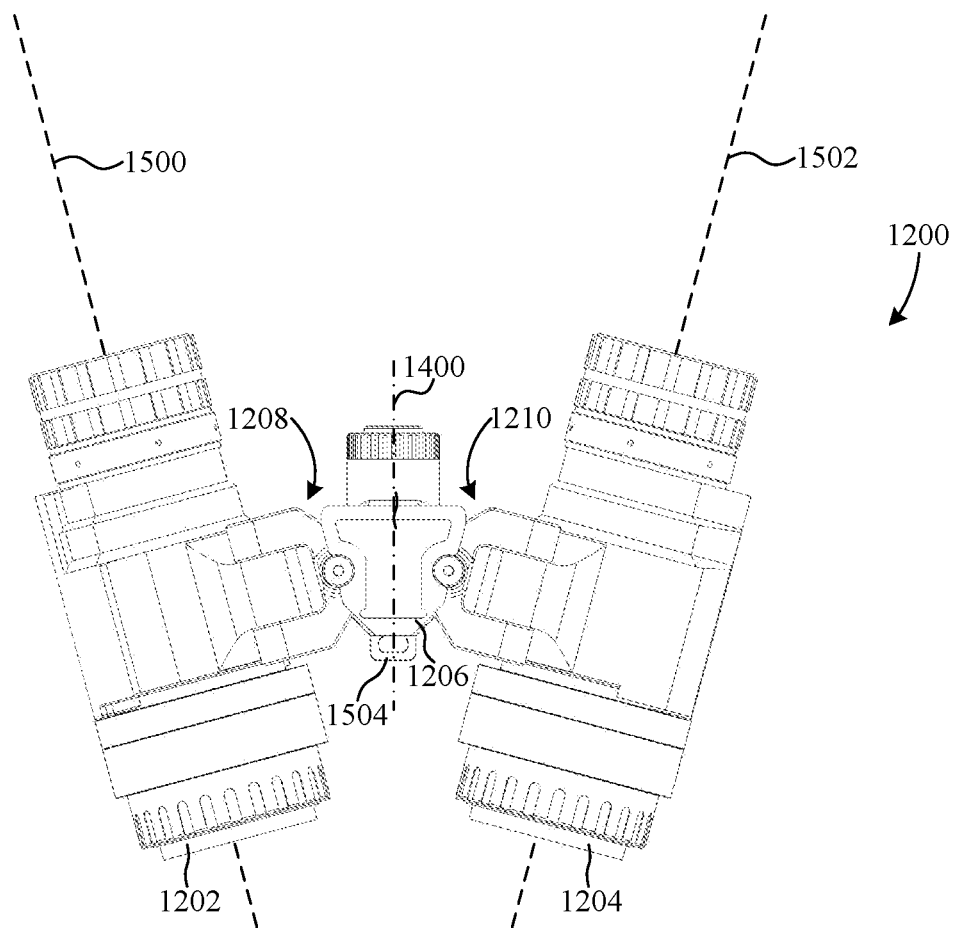
FIG. 15B is a top view of the viewing device assembly of FIG. 12, with the image intensifying monoculars in an outward pointing position.

FIG. 15B shows a top view of viewing device assembly 1200 in a fully deployed configuration, with optical axis 1500 of image intensifying monocular 1202 and optical axis 1502 of image intensifying monocular 1204 pointing outward, away from sagittal plane 1400. In this particular configuration, members 1320 and 1344 are fully rotated outward about bolts 1322 and 1346, respectively. When members 1320 and 1344 are rotated outward, the user may look through the space between intensifying monoculars 1202 and 1204 with one naked eye, while the other eye looks through one of image intensifying monoculars 1202 and 1204. As previously mentioned, the positions of arm assemblies 1208 and 1210 do not depend on one another. Accordingly, one of image intensifying monoculars 1202 and 1204 may be pointed toward sagittal plane 1400 while the other is pointed away from sagittal plane 1400.

The description of particular embodiments of the present invention is now complete. Many of the described features may be substituted, altered or omitted without departing from the scope of the invention. For example, alternate viewing devices (e.g., thermographic cameras, digital ultra-low light cameras, magnified monoculars, and so on), may be substituted for viewing devices 200, 202, 1202, and 1204. As another example, base 300, member 334, member 336, member 370, member 372, member 1000, member 1100, base 1206, member 1320, and member 1344 are all formed from a high-impact polymer, but may be formed from alternate materials. These and other deviations from the particular embodiments shown will be apparent to those skilled in the art, particularly in view of the foregoing disclosure.

I claim:

1. A viewing device mount comprising:
    a base having a sagittal plane passing therethrough, said base having a first portion disposed on a first side of said sagittal plane and a second portion disposed on a second side of said sagittal plane opposite said first side of said sagittal plane;
    a first articulating arm having a proximal end and a distal end, said first articulating arm being disposed on said first side of said sagittal plane, said first articulating arm including a first member and a second member, said first member being movably coupled to said base at a first joint, said second member being movably coupled to said first member at a second joint, said distal end of said first articulating arm being configured to couple a first optical device to said first articulating arm, said first optical device having an optical axis that, in a first position, is aligned with a reference axis, said reference axis being parallel to said sagittal plane and lying in a second plane perpendicular to said sagittal plane; and wherein
    one of said first joint and said second joint facilitates angular displacement of a portion of said optical axis of said first optical device forward of said first optical device with respect to said reference axis, in a direction away from said sagittal plane; and
    the other of said first joint and said second joint facilitates translational displacement of said optical axis of said first optical device with respect to said reference axis.

2. The viewing device mount of claim 1, wherein:
    said first member is rotatable about a first axis passing through said first joint;
    said second member is rotatable about a second axis passing through said second joint; and
    said first axis is substantially perpendicular to said second axis.

3. The viewing device mount of claim 2, wherein:
    said first joint facilitates said angular displacement of said optical axis of said first optical device with respect to said reference axis, and
    said second joint facilitates said translational displacement of said optical axis of said first optical device with respect to said reference axis.

4. The viewing device mount of claim 1, wherein
said first member frictionally engages said base at said first joint such that a position of said first member with respect to said base remains fixed absent an application of an external force exceeding inertial forces exerted thereon by said first optical device, and
said second member frictionally engages said first member at said second joint such that a position of said second member with respect to said first member remains fixed absent an application of an external force exceeding a force exerted thereon by a weight of said first optical device.

5. The viewing device mount of claim 1, wherein said base includes an attachment feature facilitating the removable attachment of said base to a complementary receiver of a head-worn device.

6. The viewing device mount of claim 1, wherein said distal end of said first articulating arm includes a fastener configured to removably attach said first optical device to said distal end of said first articulating arm.

7. The viewing device mount of claim 1, further comprising:
a second articulating arm having a proximal end and a distal end, said second articulating arm being disposed on said second side of said sagittal plane, said second articulating arm including a third member and a fourth member, said third member being movably coupled to said base at a third joint, said fourth member being movably coupled to said third member at a fourth joint, said distal end of said second articulating arm being configured to couple a second optical device to said second articulating arm, said second optical device having an optical axis that, in a first position, is aligned with a second reference axis, said second reference axis being parallel to said sagittal plane and lying in a third plane perpendicular to said sagittal plane; and wherein
one of said third joint and said fourth joint facilitates angular displacement of a portion of said optical axis of said second optical device forward of said second optical device with respect to said second reference axis, in a direction away from said sagittal plane; and
the other of said third joint and said fourth joint facilitating translational displacement of said optical axis of said second optical device with respect to said second reference axis.

8. The viewing device mount of claim 7, wherein:
said first member is rotatable about a first axis passing through said first joint;
said second member is rotatable about a second axis passing through said second joint;
said third member is rotatable about a third axis passing through said third joint;
said fourth member is rotatable about a fourth axis passing through said fourth joint;
said first axis is substantially perpendicular to said second axis; and
said third axis is substantially perpendicular to said fourth axis.

9. The viewing device mount of claim 8, wherein:
said first joint facilitates angular displacement of said optical axis of said first optical device with respect to said reference axis;
said second joint facilitates translational displacement of said optical axis of said first optical device with respect to said reference axis;
said third joint facilitates angular displacement of said optical axis of said second optical device with respect to said reference axis; and
said fourth joint facilitates translational displacement of said optical axis of said second optical device with respect to said reference axis.

10. The viewing device mount of claim 7, wherein said first articulating arm and said second articulating arm are configured to articulate independently from one another.

11. The viewing device mount of claim 7, wherein
said first member frictionally engages said base at said first joint such that a position of said first member with respect to said base remains fixed absent application of an external force that exceeds inertial forces exerted thereon by said first optical device;
said second member frictionally engages said first member at said second joint such that a position of said second member with respect to said first member remains fixed absent application of an external force that exceeds a force exerted thereon by the weight of said first optical device;
said third member frictionally engages said base at said third joint such that a position of said third member with respect to said base remains fixed absent application of an external force that exceeds inertial forces exerted thereon by said second optical device; and
said fourth member frictionally engages said third member at said fourth joint such that a position of said fourth member with respect to said third member remains fixed absent application of an external force that exceeds a force exerted thereon by the weight of said second optical device.

12. The viewing device mount of claim 7, wherein said base includes an attachment feature facilitating the removable attachment of said base to a complementary receiver of a head worn device.

13. The viewing device mount of claim 7, wherein
said distal end of said first articulating arm includes a first fastener configured to removably attach said first optical device to said distal end of said first articulating arm, and
said distal end of said second articulating arm includes a second fastener configured to removably attach said second optical device to said distal end of said second articulating arm.

14. The viewing device mount of claim 7, wherein:
said first member is a first monolithic structure;
said second member is a second monolithic structure;
said third member is a third monolithic structure;
said fourth member is a fourth monolithic structure; and
said base is a fifth monolithic structure.

15. The viewing device mount of claim 1, wherein:
said first member is a first monolithic structure;
said second member is a second monolithic structure; and
said base is a third monolithic structure.

16. A viewing device mount comprising:
a base having a sagittal plane passing therethrough, said base having a first portion disposed on a first side of said sagittal plane and a second portion disposed on a second side of said sagittal plane opposite said first side of said sagittal plane;
a first articulating arm having a first member and a second member, said first member being movably coupled to said base at a first joint, said second member being movably coupled to said first member at a second joint, said second member being configured to couple a first optical device to said first articulating arm; and wherein one of said first joint and said second joint facilitates adjustment of an adduction angle of said first optical device, whereby said first optical device can be directed away from said sagittal plane and a field of view of said first optical device can be displaced in a direction away from said sagittal plane; and the other of said first joint and said second joint facilitates transitioning said first optical device between an operating position and a stowed position.

17. The viewing device mount of claim 16, further comprising a second articulating arm having a third member and a fourth member, said third member being movably coupled to said base at a third joint, said fourth member being movably coupled to said third member at a fourth joint, said fourth member being configured to couple a second optical device to said second articulating arm; and wherein one of said third joint and said fourth joint facilitates adjustment of an adduction angle of said second optical device, whereby said second optical device can be directed away from said sagittal plane and a field of view of said second optical device can be displaced in a second direction away from said sagittal plane; and the other of said third joint and said fourth joint facilitates transitioning of said second optical device between an operating position and a stowed position.

18. The viewing device mount of claim 17, wherein said first articulating arm and said second articulating arm are configured to articulate independently from one another.

19. The viewing device mount of claim 18, wherein:

said first member is rotatable about a first axis passing through said first joint;

said second member is rotatable about a second axis passing through said second joint;

said third member is rotatable about a third axis passing through said third joint;

said fourth member is rotatable about a fourth axis passing through said fourth joint;

said first axis is substantially perpendicular to said second axis; and said third axis is substantially perpendicular to said fourth axis.

\* \* \* \* \*